United States Patent
Iwamura et al.

(10) Patent No.: US 10,017,913 B2
(45) Date of Patent: Jul. 10, 2018

(54) CONSTRUCTION MACHINE CONTROL SYSTEM, CONSTRUCTION MACHINE, AND CONSTRUCTION MACHINE CONTROL METHOD

(71) Applicant: Komatsu Ltd., Tokyo (JP)

(72) Inventors: Tsutomu Iwamura, Yokohama (JP); Jin Kitajima, Naka-gun (JP); Yoshiro Iwasaki, Naka-gun (JP); Yuto Fujii, Hirakata (JP); Takashi Yokoo, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/326,700

(22) PCT Filed: May 31, 2016

(86) PCT No.: PCT/JP2016/066078
§ 371 (c)(1),
(2) Date: Jan. 17, 2017

(87) PCT Pub. No.: WO2016/186219
PCT Pub. Date: Nov. 24, 2016

(65) Prior Publication Data
US 2017/0342679 A1    Nov. 30, 2017

(51) Int. Cl.
*E02F 3/43* (2006.01)
*E02F 3/32* (2006.01)
(Continued)

(52) U.S. Cl.
CPC ............... *E02F 3/435* (2013.01); *E02F 3/32* (2013.01); *E02F 3/3677* (2013.01);
(Continued)

(58) Field of Classification Search
CPC . E02F 3/32; E02F 3/3677; E02F 3/435; E02F 9/16; E02F 9/2004; E02F 9/2267; E02F 9/2271; E02F 9/2296; G05D 1/0278
(Continued)

(56) References Cited

U.S. PATENT DOCUMENTS 9,080,317 B2 *   7/2015  Matsuyama ............ E02F 3/435
2005/0027420 A1 * 2/2005 Fujishima ............. E02F 9/2045
                                                              701/50
(Continued)

FOREIGN PATENT DOCUMENTS

JP    2014-074319 A    4/2014
KR    20160021073 A    2/2016
(Continued)

OTHER PUBLICATIONS

International Search Report dated Aug. 30, 2016, issued for PCT/JP2016/066078.

*Primary Examiner* — Tyler J Lee
(74) *Attorney, Agent, or Firm* — Locke Lord LLP

(57) ABSTRACT

A construction machine control system includes: a target construction ground shape generation unit which generates a target construction ground shape indicating a target shape of an excavation target; a working device control instruction determination unit which outputs an instruction for driving the working device in a working device operation plane orthogonal to at least one of a boom axis, an arm axis, and a bucket axis based on an operation state of at least one of an arm and a bucket and a distance between the bucket and the target construction ground shape; and a tilting control instruction determination unit which outputs an instruction for performing a tilting control of the bucket about a tilting (Continued)

axis based on a tilting state of the bucket and the distance between the bucket and the target construction ground shape.

9 Claims, 21 Drawing Sheets

(51) Int. Cl.
E02F 3/36 (2006.01)
E02F 9/22 (2006.01)
G05D 1/02 (2006.01)
E02F 9/16 (2006.01)
E02F 9/20 (2006.01)

(52) U.S. Cl.
CPC .............. *E02F 9/2271* (2013.01); *E02F 9/16* (2013.01); *E02F 9/2004* (2013.01); *E02F 9/2267* (2013.01); *E02F 9/2296* (2013.01); *G05D 1/0278* (2013.01)

(58) Field of Classification Search
USPC .......................................................... 701/50
See application file for complete search history.

(56) References Cited

U.S. PATENT DOCUMENTS

| 2007/0010925 | A1* | 1/2007 | Yokoyama | ............. | E02F 9/261 |
| | | | | | 701/50 |
| 2013/0302124 | A1* | 11/2013 | Matsuyama | ............ | E02F 3/435 |
| | | | | | 414/687 |
| 2015/0345114 | A1 | 12/2015 | Nomura et al. | | |
| 2016/0097184 | A1 | 4/2016 | Matsuyama et al. | | |
| 2016/0251835 | A1 | 9/2016 | Kitajima et al. | | |
| 2018/0016771 | A1* | 1/2018 | Izumikawa | ............. | E02F 9/264 |

FOREIGN PATENT DOCUMENTS

WO 2014/167718 A1 10/2014
WO 2015/186180 A1 12/2015

* cited by examiner

FIG.22
(A)
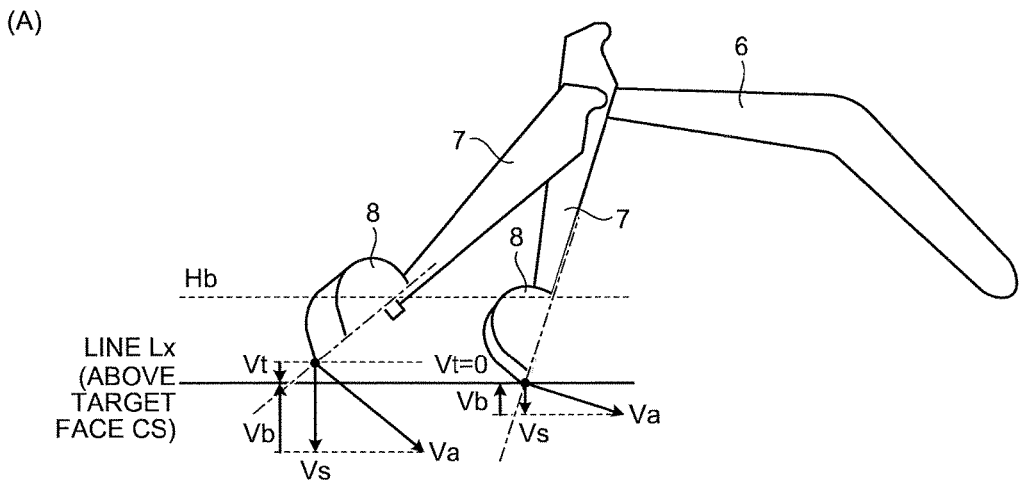
(B)
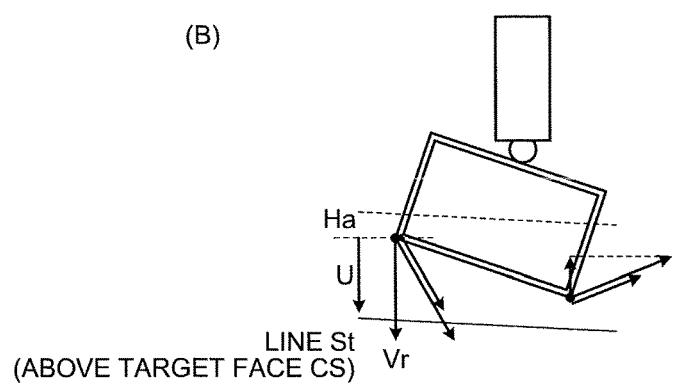
(C)
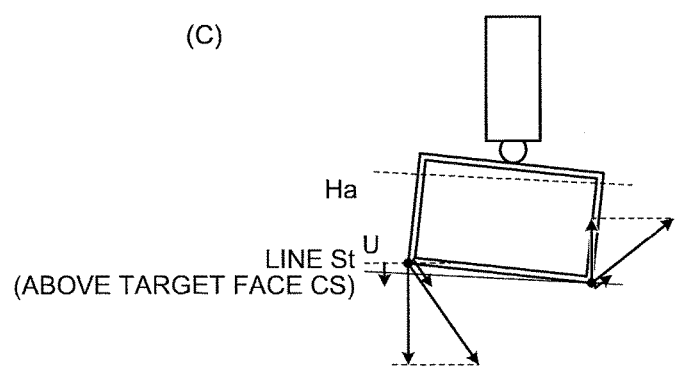

CONSTRUCTION MACHINE CONTROL SYSTEM, CONSTRUCTION MACHINE, AND CONSTRUCTION MACHINE CONTROL METHOD

FIELD

The present invention relates to a construction machine control system, a construction machine, and a construction machine control method.

BACKGROUND

In a technical field involving with a construction machine such as an excavator, as disclosed in Patent Literature 1, there is known a construction machine which controls a working device so that a tip of a bucket moves along a target construction ground shape indicating a target shape of an excavation target.

In the specification, a control of operating at least one of a boom cylinder, an arm cylinder, and a bucket cylinder of the working device so that the bucket moves along the target construction ground shape will be referred to as a stop assisting control. In the stop assisting control, a target speed of the bucket is determined based on a distance between the bucket and the target construction ground shape, a target speed of a boom is calculated based on the determined target speed of the bucket and a movement speed of a bucket derived from at least one of an arm manipulation amount and a bucket manipulation amount of an operator, and the boom cylinder is controlled based on the calculated target speed of the boom.

CITATION LIST

Patent Literature

Patent Literature 1: WO 2014/167718

SUMMARY

Technical Problem

There is known a construction machine with a tilting type bucket which is a bucket rotating about a tilting axis. Here, a technology of moving the tilting type bucket along an inclined target construction ground shape is required so that even the inclined target construction ground shape is constructed by the tilting type bucket. However, if the stop assisting control of the related art is simply applied to the tilting type bucket, there is a possibility that the tilting type bucket may not easily move along the target construction ground shape when the target speed of the boom is calculated based on the movement speed of the bucket derived based on a tilting manipulation amount of an operator.

An objective of an aspect of the invention is to provide a construction machine control system, a construction machine, and a construction machine control method capable of constructing an inclined target construction ground shape by using a tilting type bucket.

Solution to Problem

According to a first aspect of the present invention, a construction machine control system for a construction machine with a working device including a boom being rotatable about a boom axis with respect to a vehicle body, an arm being rotatable about an arm axis parallel to the boom axis with respect to the boom, and a bucket being rotatable about a bucket axis parallel to the arm axis and a tilting axis orthogonal to the bucket axis with respect to the arm, comprises: a target construction ground shape generation unit which generates a target construction ground shape indicating a target shape of an excavation target; a working device control instruction determination unit which outputs an instruction for driving the working device in a working device operation plane orthogonal to at least one of the boom axis, the arm axis, and the bucket axis based on an operation state of at least one of the arm and the bucket and a distance between the bucket and the target construction ground shape; and a tilting control instruction determination unit which outputs an instruction for performing a tilting control of the bucket about the tilting axis based on a tilting state of the bucket and the distance between the bucket and the target construction ground shape.

According to a second aspect of the present invention, a construction machine comprises: an upper swinging body; a lower traveling body which supports the upper swinging body; a working device which includes a boom, an arm, and a bucket and is supported by the upper swinging body; and the construction machine control system according to the first aspect.

According to a third aspect of the present invention, a construction machine control method of controlling a construction machine with a working device including a boom being rotatable about a boom axis with respect to a vehicle body, an arm being rotatable about an arm axis parallel to the boom axis with respect to the boom, and a bucket being rotatable about a bucket axis parallel to the arm axis and a tilting axis orthogonal to the bucket axis with respect to the arm, comprises: outputting an instruction for driving the working device in a working device operation plane orthogonal to at least one of the boom axis, the arm axis, and the bucket axis based on an operation state of at least one of the arm and the bucket and a distance between the bucket and a target construction ground shape indicating a target shape of an excavation target; and outputting an instruction for performing a tilting control of the bucket about the tilting axis based on a tilting state of the bucket and the distance between the bucket and the target construction ground shape.

Advantageous Effects of Invention

According to the aspect of the invention, it is possible to provide a construction machine control system, a construction machine, and a construction machine control method capable of constructing an inclined target construction ground shape by using a tilting type bucket.

BRIEF DESCRIPTION OF DRAWINGS

FIG. 22 is a schematic diagram illustrating an action of the bucket according to the embodiment.

DESCRIPTION OF EMBODIMENTS

Hereinafter, embodiments of the invention will be described with reference to the drawings, but the invention is not limited thereto. The components of the embodiments described below can be appropriately combined with one another. Further, there is a case where a part of the components are not used.

In the description below, a positional relation of the components will be described based on a global coordinate system (an XgYgZg coordinate system) and a local coordinate system (an XYZ coordinate system). The global coordinate system is a coordinate system which indicates an absolute position defined by a Global Navigation Satellite System (GNSS) such as a Global Positioning System (GPS). The local coordinate system is a coordinate system which indicates a relative position of a construction machine with respect to a reference position.

[Construction Machine]

Figure 1:
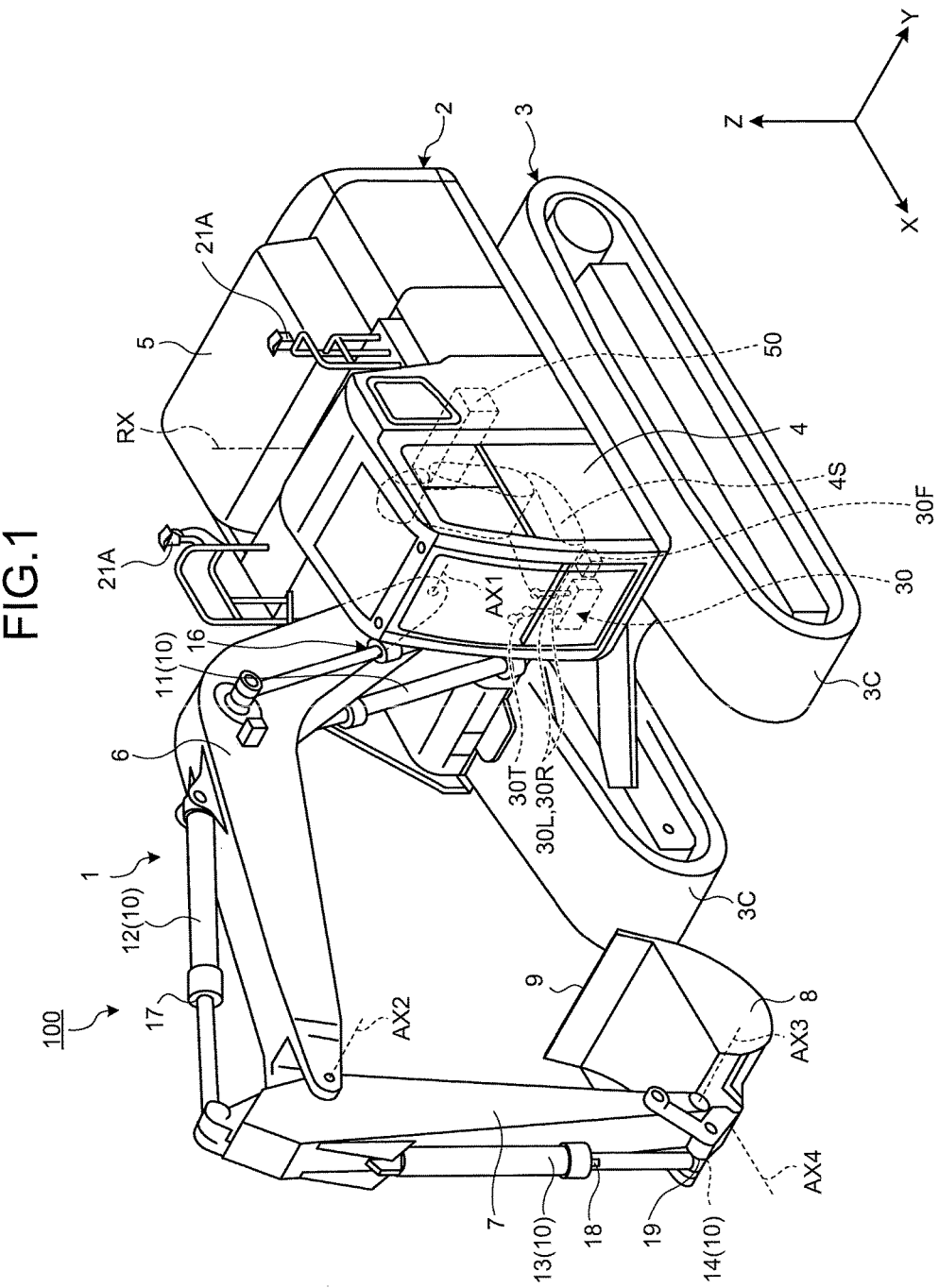
FIG. 1 is a perspective view illustrating an example of a construction machine according to the embodiment.

FIG. 1 is a perspective view illustrating an example of a construction machine 100 according to the embodiment. In the embodiment, an example in which the construction machine 100 is an excavator will be described. In the description below, the construction machine 100 will be appropriately referred to as the excavator 100.

As illustrated in FIG. 1, the excavator 100 includes a working device 1 which is operated by hydraulic oil, an upper swinging body 2 which is a vehicle body supporting the working device 1, a lower traveling body 3 which is a traveling device supporting the upper swinging body 2, a manipulation device 30 which is used to manipulate the working device 1, and a control device 50 which controls the working device 1. The upper swinging body 2 is able to swing about a swing axis RX while being supported by the lower traveling body 3.

The upper swinging body 2 includes a cab 4 on which an operator gets and a machine room 5 which receives an engine and a hydraulic pump. The cab 4 includes a driver seat 4S on which the operator sits. The machine room 5 is disposed behind the cab 4.

The lower traveling body 3 includes a pair of crawlers 3C. By the rotation of the crawlers 3C, the excavator 100 travels. Furthermore, the lower traveling body 3 may include a tire.

The working device 1 is supported by the upper swinging body 2. The working device 1 includes a boom 6 which is connected to the upper swinging body 2 through a boom pin, an arm 7 which is connected to the boom 6 through an arm pin, and a bucket 8 which is connected to the arm 7 through a bucket pin and a tilting pin. The bucket 8 includes a tip 9. In the embodiment, the tip 9 of the bucket 8 is a straight blade edge which is provided in the bucket 8. Furthermore, the tip 9 of the bucket 8 may be a convex blade edge which is provided in the bucket 8.

The boom 6 is rotatable about a boom axis AX1 which is a rotation axis with respect to the upper swinging body 2. The arm 7 is rotatable about an arm axis AX2 which is a rotation axis with respect to the boom 6. The bucket 8 is rotatable about each of a bucket axis AX3 which is a rotation axis and a tilting axis AX4 which is a rotation axis orthogonal to the bucket axis AX3 with respect to the arm 7. The rotation axis AX1, the rotation axis AX2, and the rotation axis AX3 are parallel to one another. The rotation axes AX1, AX2, and AX3 are orthogonal to an axis parallel to the swing axis RX. The rotation axes AX1, AX2, and AX3 are parallel to the Y axis of the local coordinate system. The swing axis RX is parallel to the Z axis of the local coordinate system. A direction parallel to the rotation axes AX1, AX2, and AX3 indicates a vehicle width direction of the upper swinging body 2. A direction parallel to the swing axis RX indicates a vertical direction of the upper swinging body 2. A direction orthogonal to the rotation axes AX1, AX2, and AX3 and the swing axis RX indicates an anteroposterior direction of the upper swinging body 2. A direction in which the working device 1 exists when the operator sits on the driver seat 4S indicates a front direction.

The working device 1 is operated by power generated by a hydraulic cylinder 10. The hydraulic cylinder 10 includes a boom cylinder 11 which operates the boom 6, an arm cylinder 12 which operates the arm 7, and a bucket cylinder 13 and a tilting cylinder 14 which operate the bucket 8.

Further, the working device 1 includes a boom stroke sensor 16 which detects a boom stroke indicating a driving amount of the boom cylinder 11, an arm stroke sensor 17 which detects an arm stroke indicating a driving amount of the arm cylinder 12, a bucket stroke sensor 18 which detects a bucket stroke indicating a driving amount of the bucket cylinder 13, and a tilting stroke sensor 19 which detects a tilting stroke indicating a driving amount of the tilting cylinder 14. The boom stroke sensor 16 is disposed at the boom cylinder 11. The arm stroke sensor 17 is disposed at the arm cylinder 12. The bucket stroke sensor 18 is disposed at the bucket cylinder 13. The tilting stroke sensor 19 is disposed at the tilting cylinder 14.

The manipulation device 30 is disposed at the cab 4. The manipulation device 30 includes a manipulation member that is manipulated by the operator of the excavator 100. The operator manipulates the manipulation device 30 to operate the working device 1. In the embodiment, the manipulation device 30 includes a right working device manipulation lever 30R, a left working device manipulation lever 30L, a tilting manipulation lever 30T, and a manipulation pedal 30F.

The boom 6 is lowered when the right working device manipulation lever 30R at a neutral position is manipulated forward and the boom 6 is raised when the right working device manipulation lever is manipulated backward. The bucket 8 performs a dumping operation when the right working device manipulation lever 30R at a neutral position is manipulated rightward and the bucket 8 performs an excavating operation when the right working device manipulation lever is manipulated leftward.

The arm 7 performs a dumping operation when the left working device manipulation lever 30L at a neutral position is manipulated forward and the arm 7 performs an excavating operation when the left working device manipulation lever is manipulated backward. The upper swinging body 2 swings rightward when the left working device manipulation lever 30L at a neutral position is manipulated rightward and the upper swinging body 2 swings leftward when the left working device manipulation lever is manipulated leftward.

Furthermore, the operation directions of the right working device manipulation lever 30R and the left working device manipulation lever 30L, the operation direction of the working device 1, and the swing direction of the upper swinging body 2 may not have the above-described relation.

The control device 50 includes a computing system. The control device 50 includes a processor such as a Central Processing Unit (CPU), a storage device including a non-volatile memory such as a Read Only Memory (ROM) and a volatile memory such as a Random Access Memory (RAM), and an input/output interface device.

[Bucket]

Figure 2:
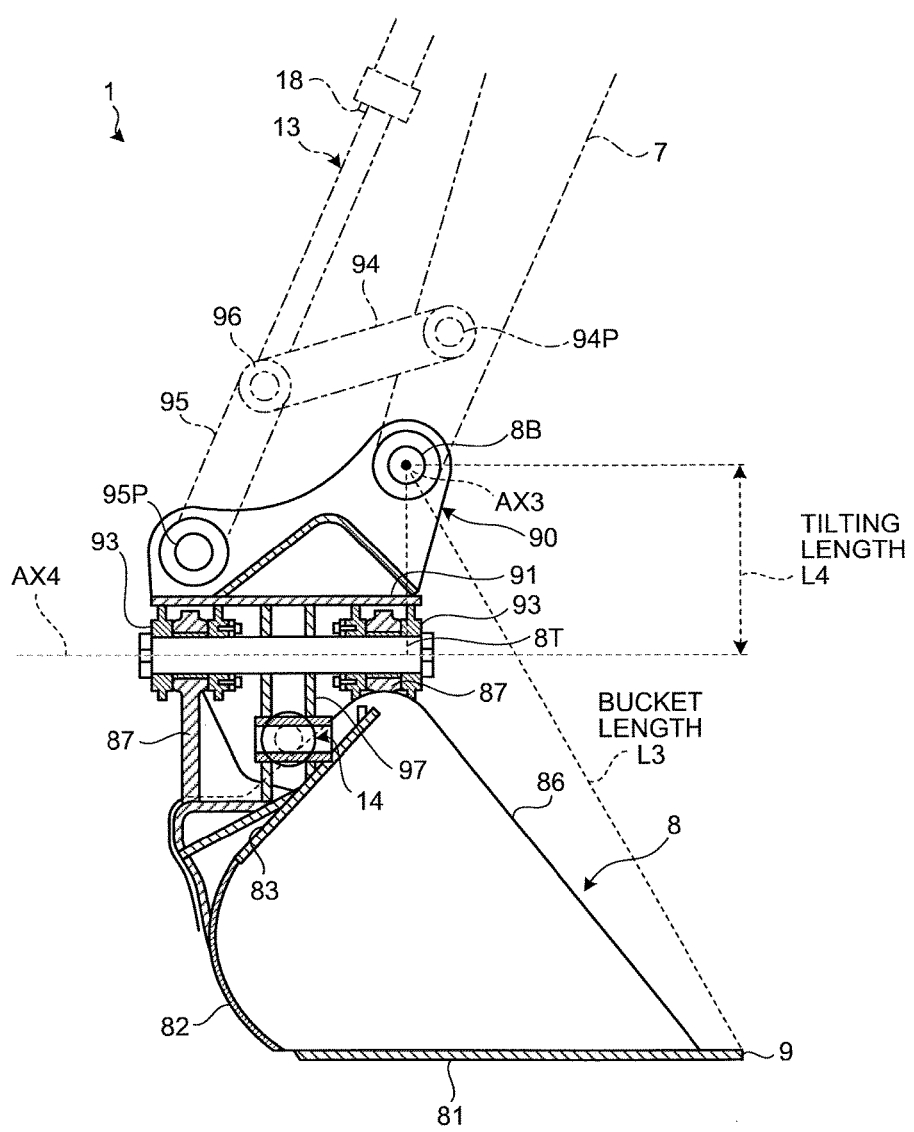
FIG. 2 is a side cross-sectional view illustrating an example of a bucket according to the embodiment.
Figure 3:
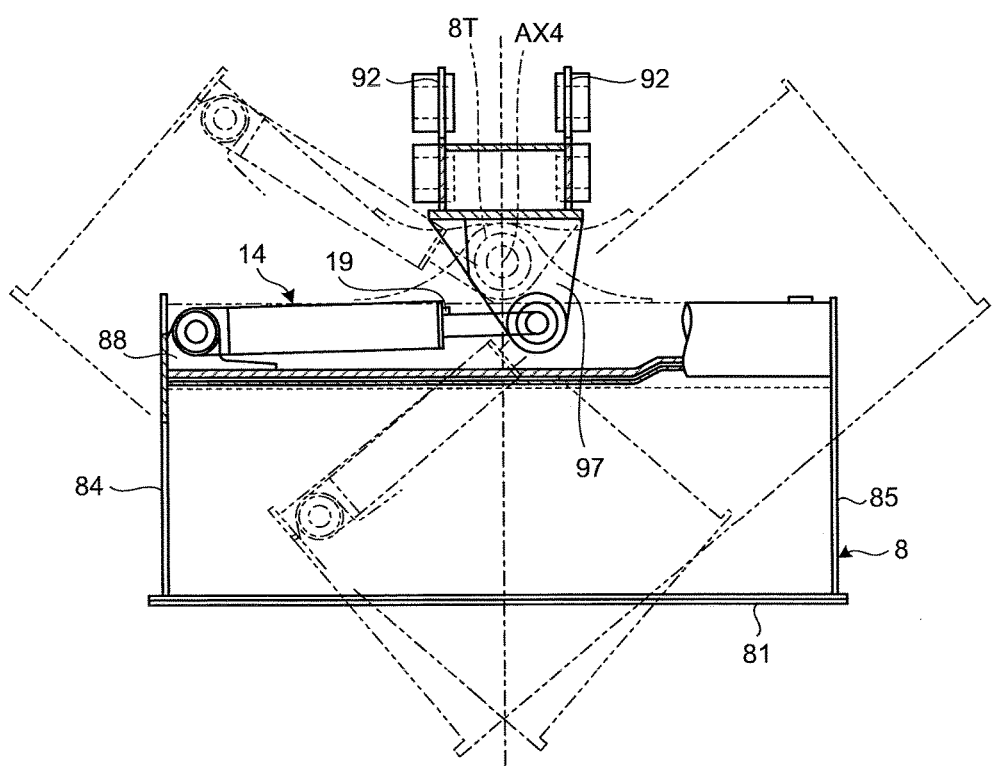
FIG. 3 is a front view illustrating an example of the bucket according to the embodiment.

Next, the bucket 8 according to the embodiment will be described. FIG. 2 is a side cross-sectional view illustrating an example of the bucket 8 according to the embodiment. FIG. 3 is a front view illustrating an example of the bucket 8 according to the embodiment. In the embodiment, the bucket 8 is a tilting type bucket.

As illustrated in FIGS. 2 and 3, the working device 1 includes the bucket 8 which is rotatable about the bucket axis AX3 and the tilting axis AX4 orthogonal to the bucket axis AX3 with respect to the arm 7. The bucket 8 is rotatably connected to the arm 7 through a bucket pin 8B. Further, the bucket 8 is rotatably supported by the arm 7 through a tilting pin 8T.

The bucket 8 is connected to a front end portion of the arm 7 through a connection member 90. The bucket pin 8B connects the arm 7 and the connection member 90 to each other. The tilting pin 8T connects the connection member 90 and the bucket 8 to each other. The bucket 8 is rotatably connected to the arm 7 through the connection member 90.

The bucket 8 includes a bottom plate 81, a rear plate 82, an upper plate 83, a side plate 84, and a side plate 85. The bucket 8 includes a bracket 87 which is provided at an upper portion of the upper plate 83. The bracket 87 is provided at the front and rear positions of the upper plate 83. The bracket 87 is connected to the connection member 90 and the tilting pin 8T.

The connection member 90 includes a plate member 91, a bracket 92 which is provided at an upper face of the plate member 91, and a bracket 93 which is provided at a lower face of the plate member 91. The bracket 92 is connected to the arm 7 and a second link pin 95P. The bracket 93 is provided at an upper portion of the bracket 87 and is connected to the tilting pin 8T and the bracket 87.

The bucket pin 8B connects the bracket 92 of the connection member 90 to the front end portion of the arm 7. The tilting pin 8T connects the bracket 93 of the connection member 90 to the bracket 87 of the bucket 8. The connection member 90 and the bucket 8 are rotatable about the bucket axis AX3 with respect to the arm 7. The bucket 8 is rotatable about the tilting axis AX4 with respect to the connection member 90.

The working device 1 includes a first link member 94 that is rotatably connected to the arm 7 through a first link pin 94P and a second link member 95 that is rotatably connected to the bracket 92 through the second link pin 95P. A base end portion of the first link member 94 is connected to the arm 7 through the first link pin 94P. A base end portion of the second link member 95 is connected to the bracket 92 through the second link pin 95P. A front end portion of the first link member 94 and a front end portion of the second link member 95 are connected to each other through a bucket cylinder top pin 96.

A front end portion of the bucket cylinder 13 is rotatably connected to the front end portion of the first link member 94 and the front end portion of the second link member 95 through the bucket cylinder top pin 96. When the bucket cylinder 13 is operated in a telescopic manner, the connection member 90 rotates about the bucket axis AX3 along with the bucket 8.

The tilting cylinder 14 is connected to each of a bracket 97 provided at the connection member 90 and a bracket 88 provided at the bucket 8. A rod of the tilting cylinder 14 is connected to the bracket 97 through a pin. A body of the tilting cylinder 14 is connected to the bracket 88 through a pin. When the tilting cylinder 14 is operated in a telescopic manner, the bucket 8 rotates about the tilting axis AX4. Furthermore, the connection structure of the tilting cylinder 14 according to the embodiment is merely an example and is not limited thereto.

In this way, the bucket 8 rotates about the bucket axis AX3 by the operation of the bucket cylinder 13. The bucket 8 rotates about the tilting axis AX4 by the operation of the tilting cylinder 14. When the bucket 8 rotates about the bucket axis AX3, the tilting pin 8T rotates along with the bucket 8.

[Detection System]

Figure 4:
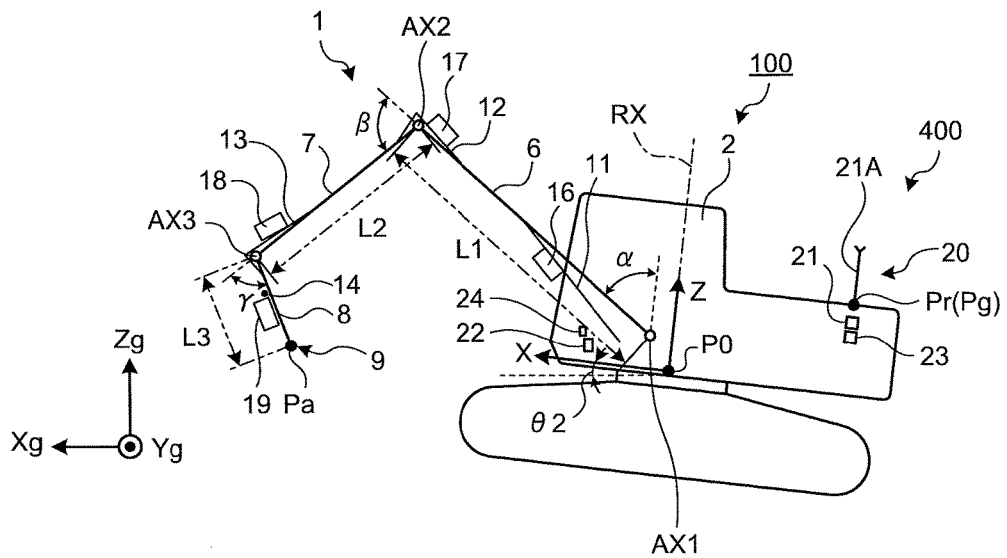
FIG. 4 is a side view schematically illustrating an excavator according to the embodiment.
Figure 5:
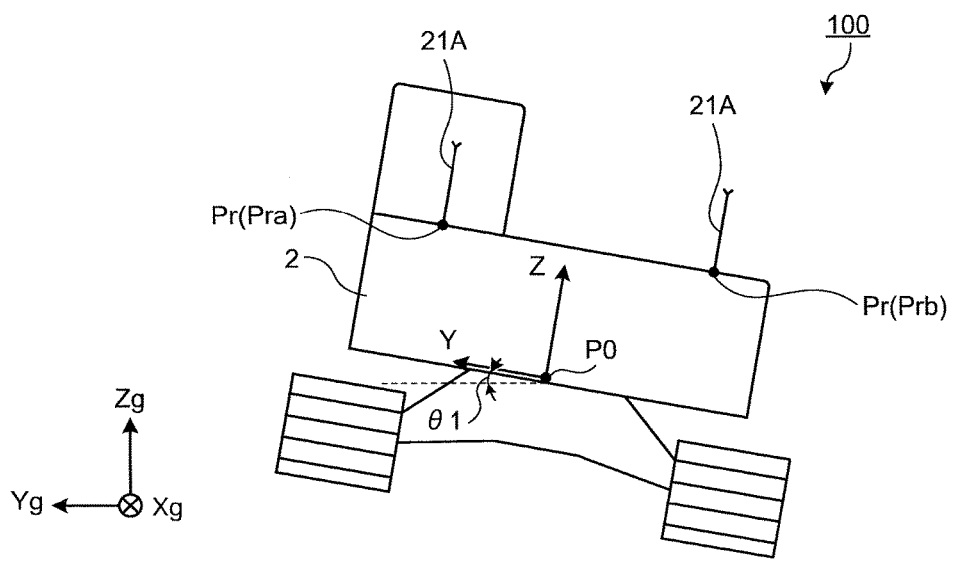
FIG. 5 is a rear view schematically illustrating the excavator according to the embodiment.
Figure 6:
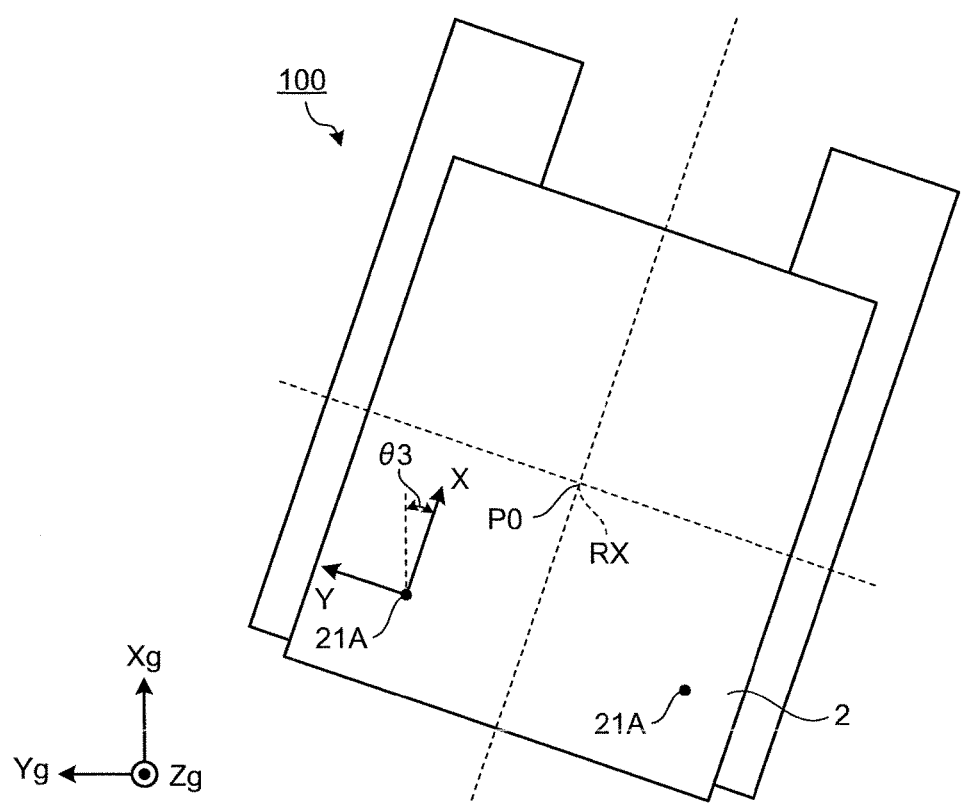
FIG. 6 is a top view schematically illustrating the excavator according to the embodiment.
Figure 7:
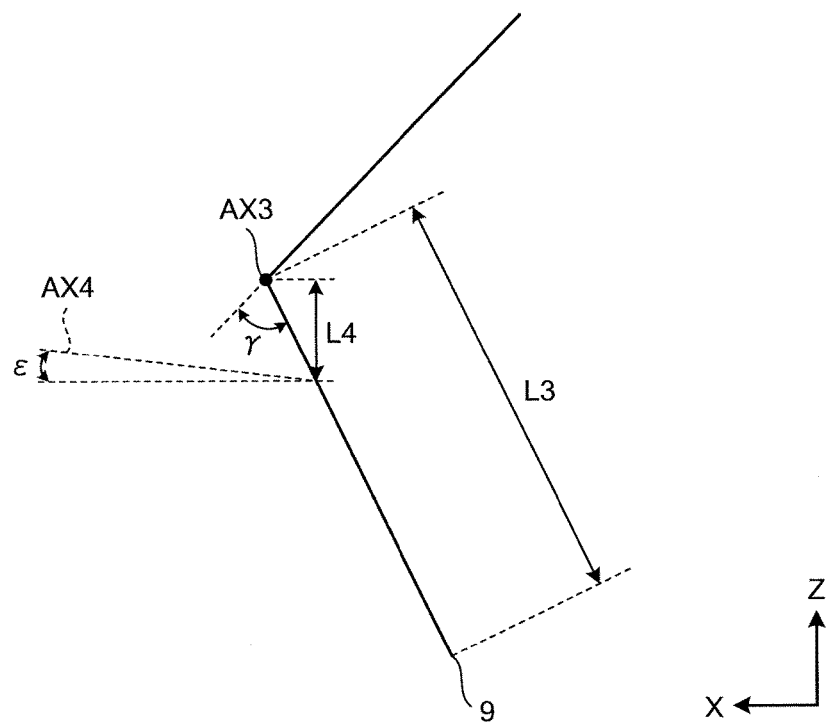
FIG. 7 is a side view schematically illustrating the bucket according to the embodiment.
Figure 8:
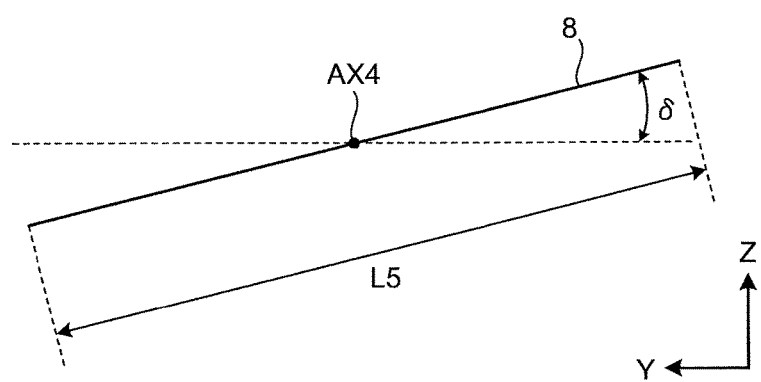
FIG. 8 is a front view schematically illustrating the bucket according to the embodiment.

Next, a detection system 400 of the excavator 100 according to the embodiment will be described. FIG. 4 is a side view schematically illustrating the excavator 100 according to the embodiment. FIG. 5 is a rear view schematically illustrating the excavator 100 according to the embodiment. FIG. 6 is a top view schematically illustrating the excavator 100 according to the embodiment. FIG. 7 is a side view schematically illustrating the bucket 8 according to the embodiment. FIG. 8 is a front view schematically illustrating the bucket 8 according to the embodiment.

As illustrated in FIGS. 4, 5, and 6, the detection system 400 includes a position calculation device 20 which calculates a position of the upper swinging body 2 and a working device angle calculation device 24 which calculates an angle of the working device 1.

The position calculation device 20 includes a vehicle body position calculator 21 which detects a position of the upper swinging body 2, a posture calculator 22 which detects a posture of the upper swinging body 2, and an orientation calculator 23 which detects an orientation of the upper swinging body 2.

The vehicle body position calculator 21 includes a GPS receiver. The vehicle body position calculator 21 is provided at the upper swinging body 2. The vehicle body position calculator 21 detects an absolute position Pg of the upper swinging body 2 defined by the global coordinate system. The absolute position Pg of the upper swinging body 2 includes coordinate data in an Xg axis direction, coordinate data in a Yg axis direction, and coordinate data in a Zg axis direction.

The upper swinging body 2 is provided with a plurality of GPS antennas 21A. The GPS antenna 21A receives a radio wave from a GPS satellite and outputs a signal generated based on the received radio wave to the vehicle body position calculator 21. The vehicle body position calculator 21 detects an installation position Pr of the GPS antenna 21A defined by the global coordinate system based on a signal supplied from the GPS antenna 21A. The vehicle body position calculator 21 detects the absolute position Pg of the upper swinging body 2 based on the installation position Pr of the GPS antenna 21A.

Two GPS antennas 21A are provided in the vehicle width direction. The vehicle body position calculator 21 detects each of an installation position Pra of one GPS antenna 21A and an installation position Prb of the other GPS antenna 21A. The vehicle body position calculator 21A performs a calculation process based on at least one of the position Pra and the position Prb to calculate the absolute position Pg of the upper swinging body 2. In the embodiment, the absolute position Pg of the upper swinging body 2 is the position Pra. Furthermore, the absolute position Pg of the upper swinging body 2 may be the position Prb or a position between the position Pra and the position Prb.

The posture calculator 22 includes an Inertial Measurement Unit (IMU). The posture calculator 22 is provided at the upper swinging body 2. The posture calculator 22 calculates an inclination angle of the upper swinging body 2 with respect to a horizontal plane (an XgYg plane) defined by the global coordinate system. The inclination angle of the upper swinging body 2 with respect to the horizontal plane includes a roll angle $\theta 1$ which indicates the inclination angle of the upper swinging body 2 in the vehicle width direction and a pitch angle $\theta 2$ which indicates the inclination angle of the upper swinging body 2 in the anteroposterior direction.

The orientation calculator 23 calculates the orientation of the upper swinging body 2 with respect to a reference orientation defined by the global coordinate system based on the installation position Pra of one GPS antenna 21A and the installation position Prb of the other GPS antenna 21A. The reference orientation is, for example, a north. The orientation calculator 23 calculates the orientation of the upper swinging body 2 with respect to the reference orientation by performing a calculation process based on the position Pra and the position Prb. The orientation calculator 23 calculates a line connecting the position Pra and the position Prb and calculates the orientation of the upper swinging body 2 with respect to the reference orientation based an angle formed by the calculated line and the reference orientation. The orientation of the upper swinging body 2 with respect to the reference orientation includes a yaw angle $\theta 3$ which is an angle formed by the reference orientation and the orientation of the upper swinging body 2.

As illustrated in FIGS. 4, 7, and 8, the working device angle calculation device 24 calculates a boom angle $\alpha$ which indicates an inclination angle of the boom 6 with respect to the Z axis of the local coordinate system based on the boom stroke detected by the boom stroke sensor 16. The working device angle calculation device 24 calculates an arm angle $\beta$ which indicates an inclination angle of the arm 7 with respect to the boom 6 based on the arm stroke detected by the arm stroke sensor 17. The working device angle calculation device 24 calculates a bucket angle $\gamma$ which indicates an inclination angle of the tip 9 of the bucket 8 with respect to the arm 7 based on the bucket stroke detected by the bucket stroke sensor 18. The working device angle calculation device 24 calculates a tilting angle $\delta$ which indicates an inclination angle of the bucket 8 with respect to the XY plane based on the tilting stroke detected by the tilting stroke sensor 19. The working device angle calculation device 24 calculates a tilting axis angle $\epsilon$ which indicates an inclination angle of the tilting axis AX4 with respect to the XY plane based on the boom stroke detected by the boom stroke sensor 16, the arm stroke detected by the arm stroke sensor 17, and the tilting stroke detected by the bucket stroke sensor 18.

Furthermore, the boom angle $\alpha$, the arm angle $\beta$, the bucket angle $\gamma$, the tilting angle $\delta$, and the tilting axis angle $\epsilon$ may be detected by, for example, angle sensors which are provided in the working device 10 instead of the stroke sensors. Further, an angle of the working device 10 may be optically detected by a stereo camera or a laser scanner and the boom angle $\alpha$, the arm angle $\beta$, the bucket angle $\gamma$, the tilting angle $\delta$, and the tilting axis angle $\epsilon$ may be calculated by using the detection result.

[Hydraulic System]

Figure 9:
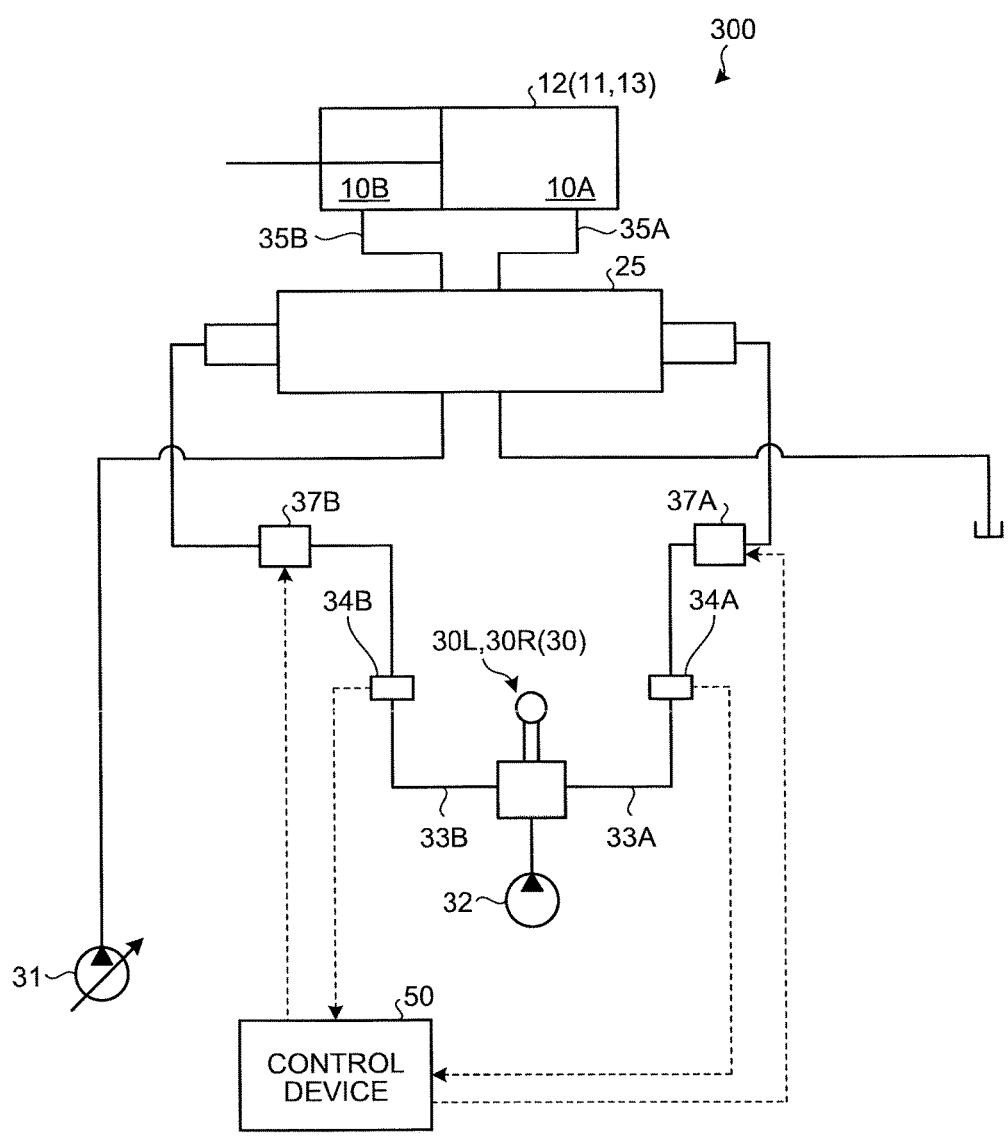
FIG. 9 is a schematic diagram illustrating an example of a hydraulic system according to the embodiment.
Figure 10:
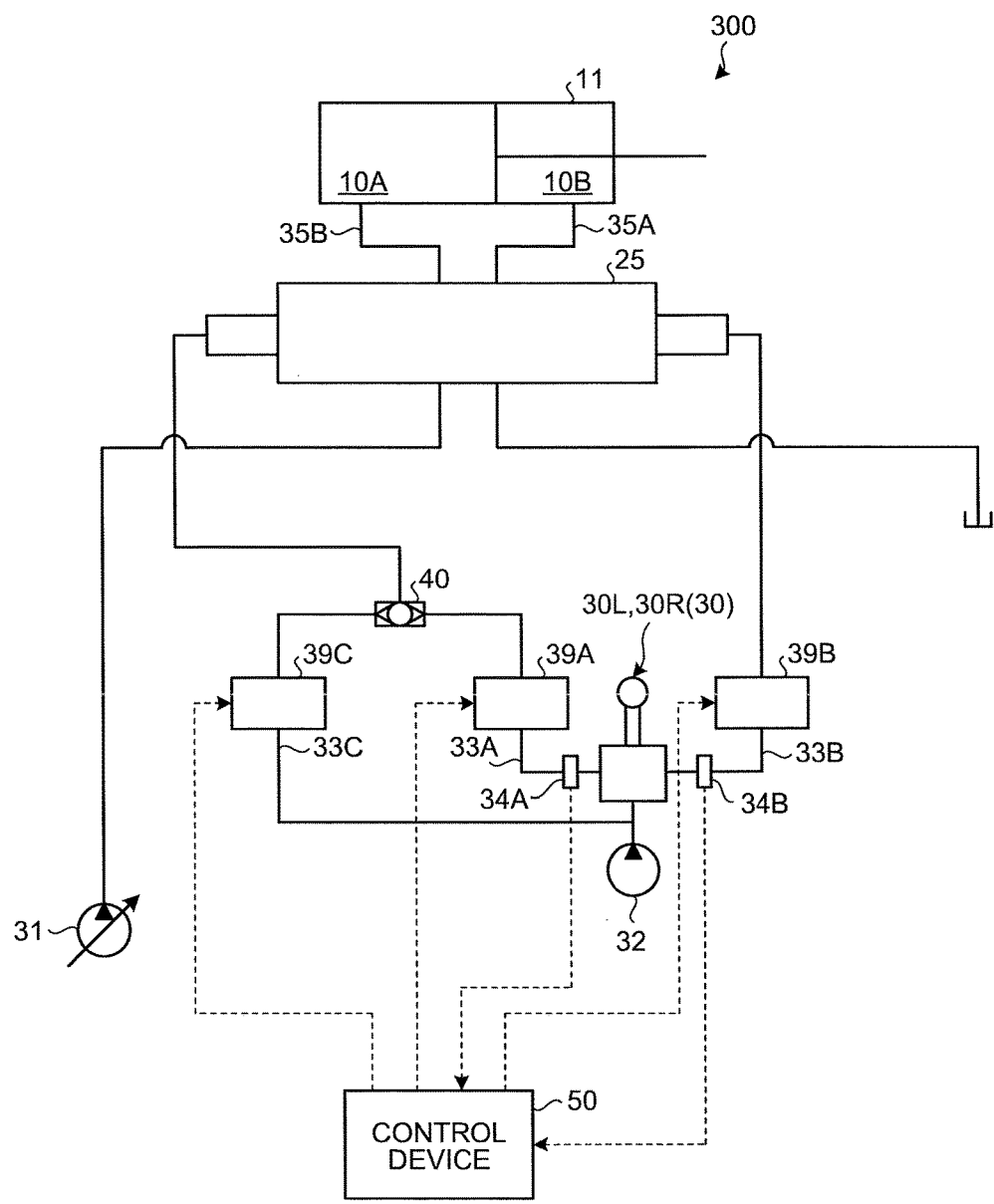
FIG. 10 is a schematic diagram illustrating an example of the hydraulic system according to the embodiment.
Figure 11:
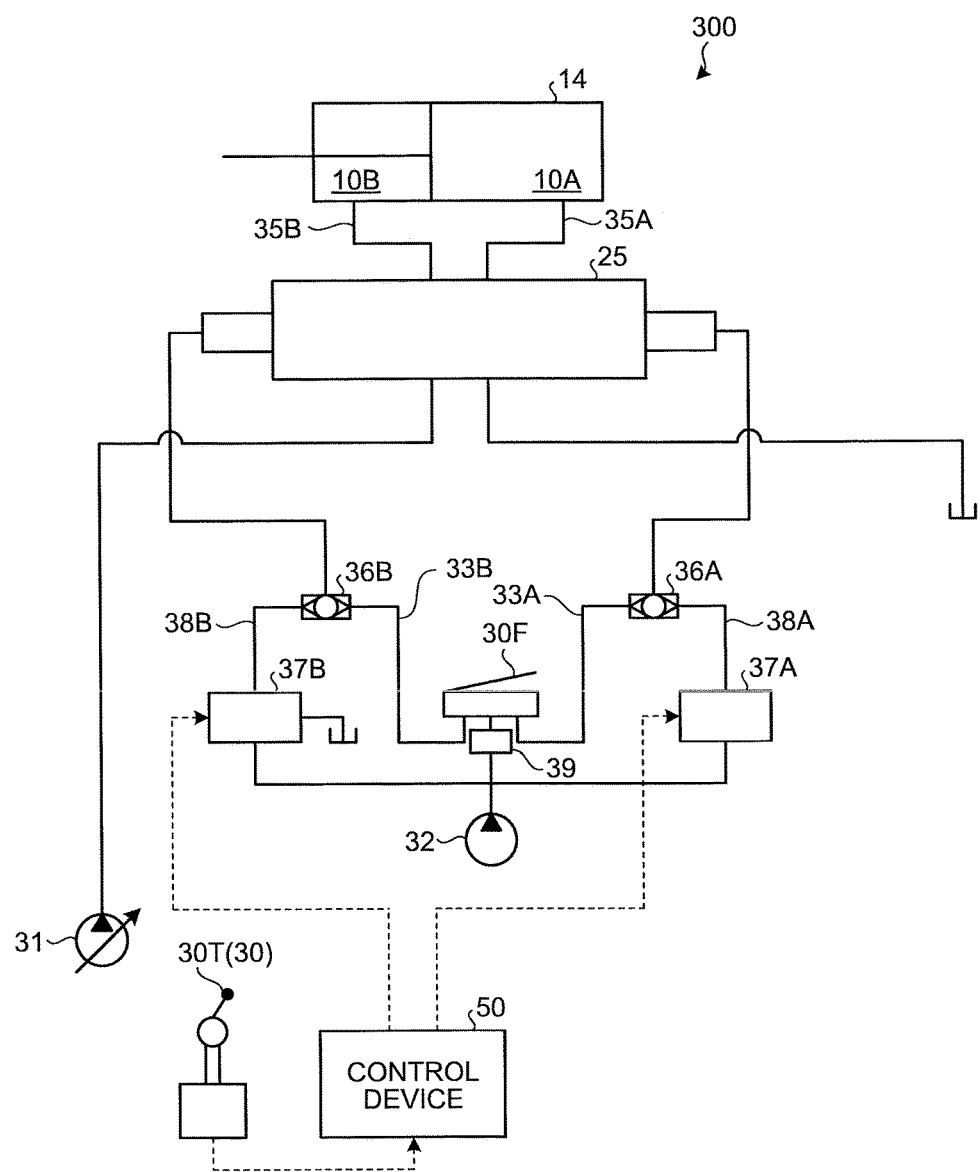
FIG. 11 is a schematic diagram illustrating an example of a hydraulic system according to the embodiment.

Next, a hydraulic system 300 of the excavator 100 according to the embodiment will be described. FIGS. 9, 10 and 11 are schematic diagrams illustrating an example of the hydraulic system 300 according to the embodiment. The hydraulic cylinder 10 which includes the boom cylinder 11, the arm cylinder 12, the bucket cylinder 13, and the tilting cylinder 14 is driven by the hydraulic system 300. The hydraulic system 300 supplies hydraulic oil to the hydraulic cylinder 10 to drive the hydraulic cylinder 10. The hydraulic system 300 includes a flow rate control valve 25. The flow rate control valve 25 controls a hydraulic oil supply amount and a hydraulic oil flow direction with respect to the hydraulic cylinder 10. The hydraulic cylinder 10 includes a cap side oil chamber 10A and a rod side oil chamber 10B. The cap side oil chamber 10A is a space between a cylinder head cover and a piston. The rod side oil chamber 10B is a space where the piston rod is disposed. When the hydraulic oil is supplied to the cap side oil chamber 10A through an oil passage 35A, the hydraulic cylinder 10 is lengthened. When the hydraulic oil is supplied to the rod side oil chamber 10B through an oil passage 35B, the hydraulic cylinder 10 is shortened.

FIG. 9 is a schematic diagram illustrating an example of the hydraulic system 300 that operates the arm cylinder 12. The hydraulic system 300 includes a variable displacement type main hydraulic pump 31 which supplies the hydraulic oil, a pilot pressure pump 32 which supplies the pilot oil, oil passages 33A and 33B through which the pilot oil flows, pressure sensors 34A and 34B which are disposed at the oil passages 33A and 33B, control valves 37A and 37B which adjust the pilot pressure acting on the flow rate control valve 25, the manipulation device 30 which includes the right working device manipulation lever 30R and the left working device manipulation lever 30L used to adjust the pilot pressure for the flow rate control valve 25, and the control device 50. The right working device manipulation lever 30R and the left working device manipulation lever 30L of the manipulation device 30 are pilot hydraulic type manipulation devices.

The hydraulic oil which is supplied from the main hydraulic pump 31 is supplied to the arm cylinder 12 through the direction control valve 25. The flow rate control valve 25 is a slide spool type flow rate control valve which moves a spool in a rod shape in the axis direction to switch a hydraulic oil flow direction. When the spool moves in the axis direction, the supply of the hydraulic oil to the cap side oil chamber 10A of the arm cylinder 12 and the supply of the hydraulic oil to the rod side oil chamber 10B are switched. Further, when the spool moves in the axis direction, the hydraulic oil supply amount per unit time for the arm cylinder 12 is adjusted. When the hydraulic oil supply amount for the arm cylinder 12 is adjusted, a cylinder speed is adjusted.

The flow rate control valve 25 is manipulated by the manipulation device 30. The pilot oil which is fed from the pilot pressure pump 32 is supplied to the manipulation device 30. Furthermore, the pilot oil which is fed from the main hydraulic pump 31 and is decreased in pressure by the pressure reduction valve may be supplied to the manipulation device 30. The manipulation device 30 includes a pilot pressure adjustment valve. The control valves 37A and 37B are operated based on the manipulation amount of the manipulation device 30 so that the pilot pressure acting on the spool of the flow rate control valve 25 is adjusted. The flow rate control valve 25 is driven by the pilot pressure. When the pilot pressure is adjusted by the manipulation device 30, the movement amount, the movement speed, and the movement direction of the spool in the axis direction are adjusted.

The flow rate control valve 25 includes a first pressure receiving chamber and a second pressure receiving chamber. When the left working device manipulation lever 30L is manipulated to be inclined toward one side from the neutral position so that the spool is moved by the pilot pressure of the oil passage 33A, the hydraulic oil is supplied from the main hydraulic pump 31 to the first pressure receiving chamber and the hydraulic oil is supplied to the cap side oil chamber 10A through the oil passage 35A. When the left working device manipulation lever 30L is manipulated to be inclined toward the other side from the neutral position so that the spool is moved by the pilot pressure of the oil passage 33B, the hydraulic oil is supplied from the main hydraulic pump 31 to the second pressure receiving chamber and the hydraulic oil is supplied to the rod side oil chamber 10B through the oil passage 35B.

The pressure sensor 34A detects the pilot pressure of the oil passage 33A. The pressure sensor 34B detects the pilot pressure of the oil passage 33B. The detection signals of the pressure sensors 33A and 33B are output to the control device 50. The control device 50 adjusts the pilot pressure by outputting a control signal to control valves 37A and 37B.

When the hydraulic oil is supplied to the cap side oil chamber 10A of the arm cylinder 12, the arm cylinder 12 is lengthened so that the arm 7 performs an excavating operation. When the hydraulic oil is supplied to the rod side oil chamber 10B of the arm cylinder 12, the arm cylinder 12 is shortened so that the arm 7 performs a dumping operation.

The hydraulic system 300 which operates the bucket cylinder 13 has the same configuration as that of the hydraulic system 300 which operates the arm cylinder 12. When the hydraulic oil is supplied to the cap side oil chamber 10A of the bucket cylinder 13, the bucket cylinder 13 is lengthened so that the bucket 8 performs an excavating operation. When the hydraulic oil is supplied to the rod side oil chamber 10B of the bucket cylinder 13, the bucket cylinder 13 is shortened so that the bucket 8 performs a dumping operation.

Furthermore, the right working device manipulation lever 30R and the left working device manipulation lever 30L of the manipulation device 30 may not be of the pilot hydraulic type. The right working device manipulation lever 30R and the left working device manipulation lever 30L may be of an electronic lever type in which an electric signal is output to the control device 50 based on the manipulation amounts (the inclination angles) of the right working device manipulation lever 30R and the left working device manipulation lever 30L and the flow rate control valve 25 is directly controlled based on the control signal of the control device 50.

FIG. 10 is a diagram schematically illustrating an example of the hydraulic system 300 that operates the boom cylinder 11. The hydraulic system 300 includes a flow rate control valve 25 which adjusts a hydraulic oil supply amount to the boom cylinder 11, oil passages 33A, 33B, and 33C through which the pilot oil flows, control valves 39A, 39B, and 39C which are disposed at the oil passages 33A, 33B, and 33C, pressure sensors 34A and 34B which are disposed at the oil passages 33A and 33B, and a control device 50 which controls the control valves 39A, 39B, and 39C.

The control valves 39A, 39B, and 39C are electromagnetic proportional control valves. The control valves 39A, 39B, and 39C adjust the pilot pressure based on a control signal from the control device 50. The control valve 39A adjusts the pilot pressure of the oil passage 33A. The control valve 39B adjusts the pilot pressure of the oil passage 33B. The control valve 39C adjusts the pilot pressure of the oil passage 33C.

The control device 50 can decrease the pilot pressure acting on a first pressure receiving chamber of the flow rate control valve 25 by controlling the control valve 39B. The control device 50 can decrease the pilot pressure acting on a second pressure receiving chamber of the flow rate control valve 25 by controlling the control valve 39A. The control device 50 controls the control valve 39A based on a detection signal of the pressure sensor 34A. The control device 50 controls the control valve 39B based on a detection signal of the pressure sensor 34B. The control device 50 adjusts the pilot pressure by outputting a control signal to the control valves 39A and 39B. When the pilot pressure is adjusted, the boom cylinder 11 is controlled.

In the embodiment, the control valve 39C is operated based on the control signal output from the control device 50 for the stop assisting control. The pilot oil which is fed from the pilot pressure pump 32 flows to the oil passage 33C provided with the control valve 39C. The oil passage 33C and the oil passage 33A are connected to each other by a shuttle valve 40. The shuttle valve 40 supplies the pilot oil having a high pilot pressure among the oil passage 33A and the oil passage 33C to the flow rate control valve 25.

When the hydraulic oil is supplied to the cap side oil chamber 10A of the boom cylinder 11, the boom cylinder 11 is lengthened so that the boom 6 is raised. When the hydraulic oil is supplied to the rod side oil chamber 10B of the boom cylinder 12, the boom cylinder 11 is shortened so that the boom 6 is lowered.

When the stop assisting control is not performed, the flow rate control valve 25 is driven based on the pilot pressure adjusted by the manipulation of the left working device manipulation lever 30L. When the stop assisting control is performed, the control device 50 controls the control valves 39A, 39B, and 39C so that the flow rate control valve 25 is driven based on the pilot pressure adjusted by the control valve 39C.

FIG. 11 is a diagram schematically illustrating an example of the hydraulic system 300 that operates the tilting cylinder 14. The hydraulic system 300 includes the flow rate control valve 25 which adjusts the hydraulic oil supply amount for the tilting cylinder 14, the control valves 37A and 37B which adjust the pilot pressure acting on the flow rate control valve 25, a control valve 39 which is disposed between the pilot pressure pump 32 and the manipulation pedal 30F, the tilting manipulation lever 30T and the manipulation pedal 30F of the manipulation device 30, and the control device 50. In the embodiment, the manipulation pedal 30F of the manipulation device 30 is a pilot hydraulic type manipulation device. The tilting manipulation lever 30T of the manipulation device 30 is an electronic lever type manipulation device. The tilting manipulation lever 30T includes a manipulation button provided at each of the right working device manipulation lever 30R and the left working device manipulation lever 30L.

The manipulation pedal 30F of the manipulation device 30 is connected to the pilot pressure pump 32. Further, the manipulation pedal 30F is connected to an oil passage 38A in which the pilot oil fed from the control valve 37A flows through a shuttle valve 36A. Further, the manipulation pedal 30F is connected to an oil passage 38B in which the pilot oil fed from the control valve 37B flows through a shuttle valve 36B. When the manipulation pedal 30F is manipulated, the pressure of the oil passage 33A between the manipulation pedal 30F and the shuttle valve 36A and the pressure of the oil passage 33B between the manipulation pedal 30F and the shuttle valve 36B are adjusted.

When the tilting manipulation lever 30T is operated, a manipulation signal generated by the manipulation of the tilting manipulation lever 30T is output to the control device 50. The control device 50 generates a control signal based on the manipulation signal output from the tilting manipulation lever 30T to control the control valves 37A and 37B. The control valves 37A and 37B are electromagnetic proportional control valves. The control valve 37A opens or closes the oil passage 38A based on the control signal. The control valve 37B opens or closes the oil passage 38B based on the control signal.

When the tilting control is not performed, the pilot pressure is adjusted based on the manipulation amount of the manipulation device 30. When the tilting control is performed, the control device 50 adjusts the pilot pressure by outputting a control signal to the control valves 37A and 37B.

[Control System]

Figure 12:
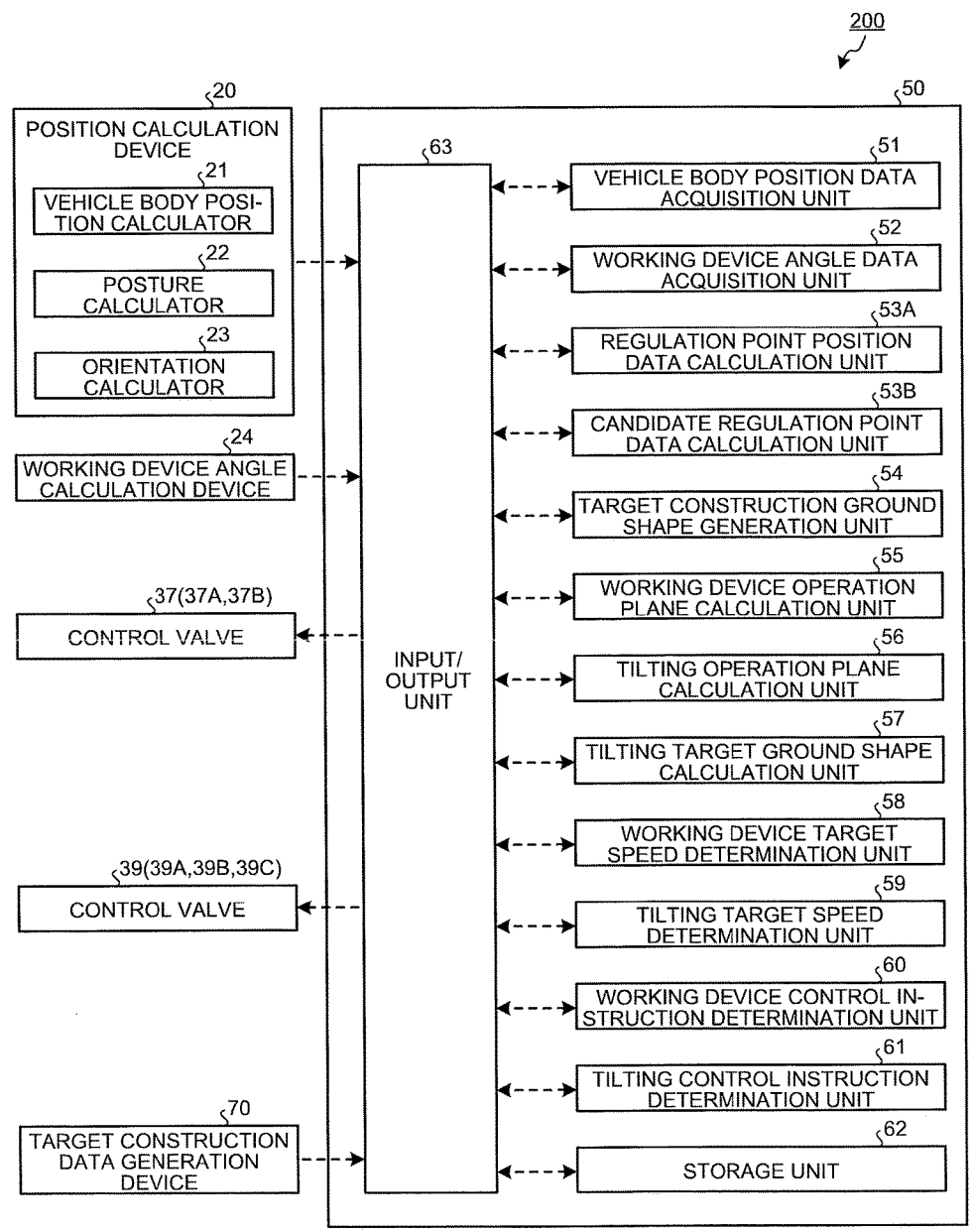
FIG. 12 is a functional block diagram illustrating an example of a control system according to the embodiment.

Next, a control system 200 of the excavator 100 according to the embodiment will be described. FIG. 12 is a functional block diagram illustrating an example of the control system 200 according to the embodiment.

As illustrated in FIG. 12, the control system 200 includes the control device 50 which controls the working device 1, a position calculation device 20, a working device angle calculation device 24, the control valve 37 (37A, 37B), the control valve 39 (39A, 39B, 39C), and a target construction data generation device 70.

The position calculation device 20 detects the absolute position Pg of the upper swinging body 2, the posture of the upper swinging body 2 including the roll angle θ1 and the pitch angle θ2, and the orientation of the upper swinging body 2 including the yaw angle θ3.

The position calculation device 20 includes the vehicle body position calculator 21, the posture calculator 22, and the orientation calculator 23. The position calculation device 20 detects the absolute position Pg of the upper swinging body 2, the posture of the upper swinging body 2 including the roll angle θ1 and the pitch angle θ2, and the orientation of the upper swinging body 2 including the yaw angle θ3.

The working device angle calculation device 24 detects the angle of the working device 1 including the boom angle α, the arm angle β, the bucket angle γ, the tilting angle δ, and the tilting axis angle ε.

The control valve 37 (37A, 37B) adjusts the hydraulic oil supply amount for the tilting cylinder 14. The control valve 37 is operated based on the control signal from the control device 50.

The control valve 39 (39A, 39B, 39C) adjusts the hydraulic oil supply amount to the boom cylinder 11. The control valve 39 is operated based on a control signal from the control device 50.

The target construction data generation device 70 includes a computing system. The target construction data generation device 70 generates target construction data indicating a target ground shape which is a target shape of a construction area. The target construction data indicates a three-dimensional target shape obtained by a construction using the working device 1.

The target construction data generation device 70 is provided at a remote place separated from the excavator 100. The target construction data generation device 70 is provided at, for example, equipment of a construction management company. The target construction data generation device 70 and the control device 50 can wirelessly communicate with each other. The target construction data generated by the target construction data generation device 70 is wirelessly transmitted to the control device 50.

Furthermore, the target construction data generation device 70 and the control device 50 may be connected to each other by a wire so that the target construction data is transmitted from the target construction data generation device 70 to the control device 50. Furthermore, the target construction data generation device 70 may include a recording medium storing the target construction data and the control device 50 may include a device capable of reading the target construction data from the recording medium.

Furthermore, the target construction data generation device 70 may be provided at the excavator 100. The target construction data may be transmitted from an external management device which manages a construction to the target construction data generation device 70 of the excavator 100 in a wired or wireless manner so that the target construction data generation device 70 stores the target construction data transmitted thereto.

The control device 50 includes a vehicle body position data acquisition unit 51, a working device angle data acquisition unit 52, a regulation point position data calculation unit 53A, a candidate regulation point data calculation unit 53B, a target construction ground shape generation unit 54, a working device operation plane calculation unit 55, a tilting operation plane calculation unit 56, a tilting target ground shape calculation unit 57, a working device target speed determination unit 58, a tilting target speed determination unit 59, a working device control instruction determination unit 60, a tilting control instruction determination unit 61, a storage unit 62, and an input/output unit 63.

The functions of the vehicle body position data acquisition unit 51, the working device angle data acquisition unit 52, the regulation point position data calculation unit 53A, the candidate regulation point data calculation unit 53B, the target construction ground shape generation unit 54, the working device operation plane calculation unit 55, the tilting operation plane calculation unit 56, the tilting target ground shape calculation unit 57, the working device target speed determination unit 58, the tilting target speed determination unit 59, the working device control instruction determination unit 60, and the tilting control instruction determination unit 61 are exhibited by the processor of the control device 50. The function of the storage unit 62 is exhibited by a storage device of the control device 50. The function of the input/output unit 63 is exhibited by an input/output interface device of the control device 50. The input/output unit 63 is connected to the position calculation device 20, the working device angle calculation device 24, the control valve 37, the control valve 39, and the target construction data generation device 70 and performs a data communication with the vehicle body position data acquisition unit 51, the working device angle data acquisition unit 52, the regulation point position data calculation unit 53A, the candidate regulation point data calculation unit 53B, the target construction ground shape generation unit 54, the working device operation plane calculation unit 55, the tilting operation plane calculation unit 56, the tilting target ground shape calculation unit 57, the working device target speed determination unit 58, the tilting target speed determination unit 59, the working device control instruction determination unit 60, the tilting control instruction determination unit 61, and the storage unit 62.

The storage unit 62 stores specification data of the excavator 100 including working device data.

The vehicle body position data acquisition unit 51 acquires vehicle body position data from the position calculation device 20 via the input/output unit 63. The vehicle body position data includes the absolute position Pg of the upper swinging body 2 defined by the global coordinate system, the posture of the upper swinging body 2 including the roll angle θ1 and the pitch angle θ2, and the orientation of the upper swinging body 2 including the yaw angle θ3.

The working device angle data acquisition unit 52 acquires working device angle data from the working device angle calculation device 24 via the input/output unit 63. The working device angle data is used to detect the angle of the working device 1 including the boom angle α, the arm angle β, the bucket angle γ, the tilting angle δ, and the tilting axis angle ε.

The regulation point position data calculation unit 53A calculates position data of a regulation point RP set in the bucket 8 based on a target construction ground shape, width data of the bucket 8, and outer face data of the bucket 8. A regulation point position data calculation unit 53 calculates the position data of the regulation point RP set in the bucket 8 based on the vehicle body position data acquired by the vehicle body position data acquisition unit 51, the working device angle data acquired by the working device angle data acquisition unit 52, and the working device data stored in the storage unit 59.

As illustrated in FIG. 4, the working device data includes a boom length L1, an arm length L2, a bucket length L3, a tilting length L4, and a bucket width L5. The boom length L1 is a distance between the boom axis AX1 and the arm axis AX2. The arm length L2 is a distance between the arm axis AX2 and the bucket axis AX3. The bucket length L3 is a distance between the bucket axis AX3 and the tip 9 of the bucket 8. The tilting length L4 is a distance between the bucket axis AX3 and the tilting axis AX4. The bucket width L5 is a distance between the side plate 84 and the side plate 85.

Figure 13:
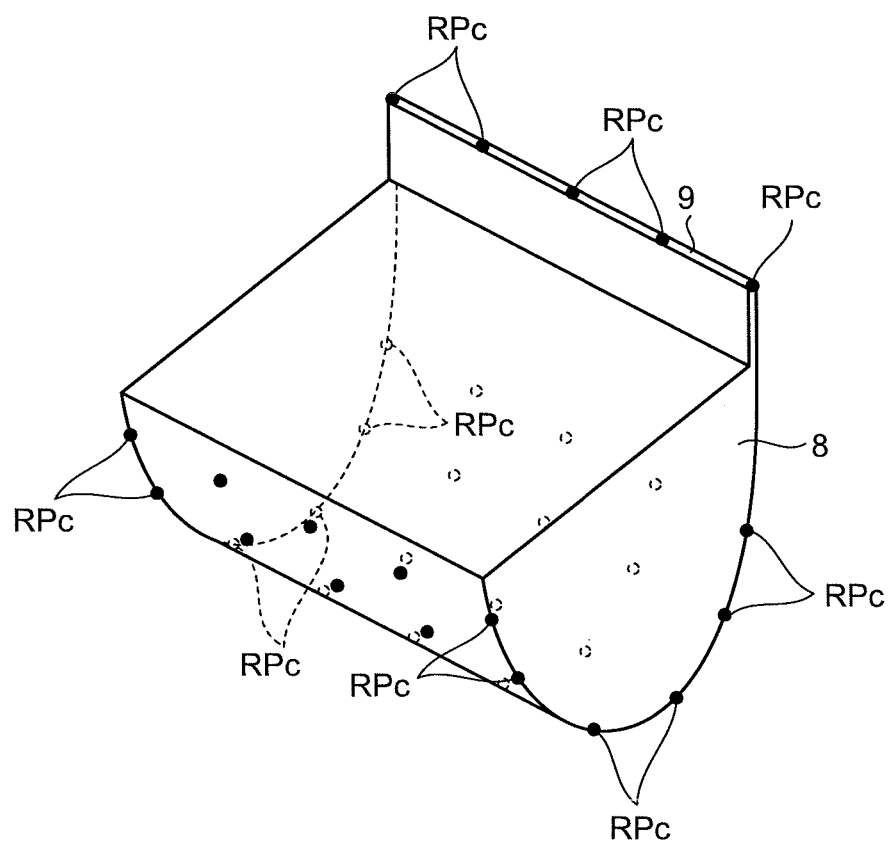
FIG. 13 is a diagram schematically illustrating an example of a regulation point set in a bucket according to the embodiment.

FIG. 13 is a diagram schematically illustrating an example of the regulation point RP set in the bucket 8 according to the embodiment. As illustrated in FIG. 13, a plurality of candidate regulation points RPc which are candidates of the regulation point RP used in the tilting control are set in the bucket 8. The candidate regulation point RPc is set at the tip 9 of the bucket 8 and the outer face of the bucket 8. The plurality of candidate regulation points RPc are set in the tip 9 in a bucket width direction. Further, the plurality of candidate regulation points RPc are set in the outer face of the bucket 8.

Further, the working device data includes bucket external shape data indicating a shape and a dimension of the bucket 8. The bucket external shape data includes width data of the bucket 8 indicating the bucket width L5. Further, the bucket external shape data includes the outer face data of the bucket 8 including outline data of the outer face of the bucket 8. Further, the bucket external shape data includes coordinate data of the plurality of candidate regulation points RPc of the bucket 8 based on the tip 9 of the bucket 8.

The candidate regulation point data calculation unit 53B calculates position data of the plurality of candidate regulation points RPc which are candidates of the regulation point RP. The candidate regulation point data calculation unit 53B calculates the relative positions of the plurality of candidate regulation points RPc with respect to a reference position P0 of the upper swinging body 2. Further, the regulation point position data calculation unit 53 calculates the absolute positions of the plurality of candidate regulation points RPc.

The candidate regulation point data calculation unit 53B can calculate the relative positions of the plurality of candidate regulation points RPc of the bucket 8 with respect to the reference position P0 of the upper swinging body 2 based on the working device data including the boom length L1, the arm length L2, the bucket length L3, the tilting length L4, and the bucket external shape data and the working device angle data including the boom angle α, the arm angle β, the bucket angle γ, the tilting angle δ, and the tilting axis angle ε. As illustrated in FIG. 4, the reference position P0 of the upper swinging body 2 is set in the swing axis RX of the upper swinging body 2. Furthermore, the reference position P0 of the upper swinging body 2 may be set in the boom axis AX1.

Further, the candidate regulation point data calculation unit 53B can calculate the absolute position Pa of the bucket 8 based on the relative position of the bucket 8 with respect to the reference position P0 of the upper swinging body 2 and the absolute position Pg of the upper swinging body 2 detected by the position calculation device 20. The relative position between the absolute position Pg and the reference position P0 is given data derived from the specification data of the excavator 100. The candidate regulation point data calculation unit 53B can calculate the absolute positions of the plurality of candidate regulation points RPc of the bucket 8 based on the vehicle body position data including the absolute position Pg of the upper swinging body 2, the relative position of the bucket 8 with respect to the reference position P0 of the upper swinging body 2, the working device data, and the working device angle data.

Furthermore, the candidate regulation point RPc is not limited to a point as long as the width data of the bucket 8 and the outer face data of the bucket 8 are included in the point.

The target construction ground shape generation unit 54 generates a target construction ground shape CS which indicates the target shape of the excavation target based on the target construction data supplied from the target construction data generation device 70 and stored in the storage unit 62. The target construction data generation device 70 may supply three-dimensional target ground shape data which is target construction data to the target construction ground shape generation unit 54 and may supply a plurality of pieces of line data or point data indicating a part of the target shape to the target construction ground shape generation unit 54. In the embodiment, it is assumed that the target construction data generation device 70 supplies line data indicating a part of the target shape as the target construction data to the target construction ground shape generation unit 54.

Figure 14:
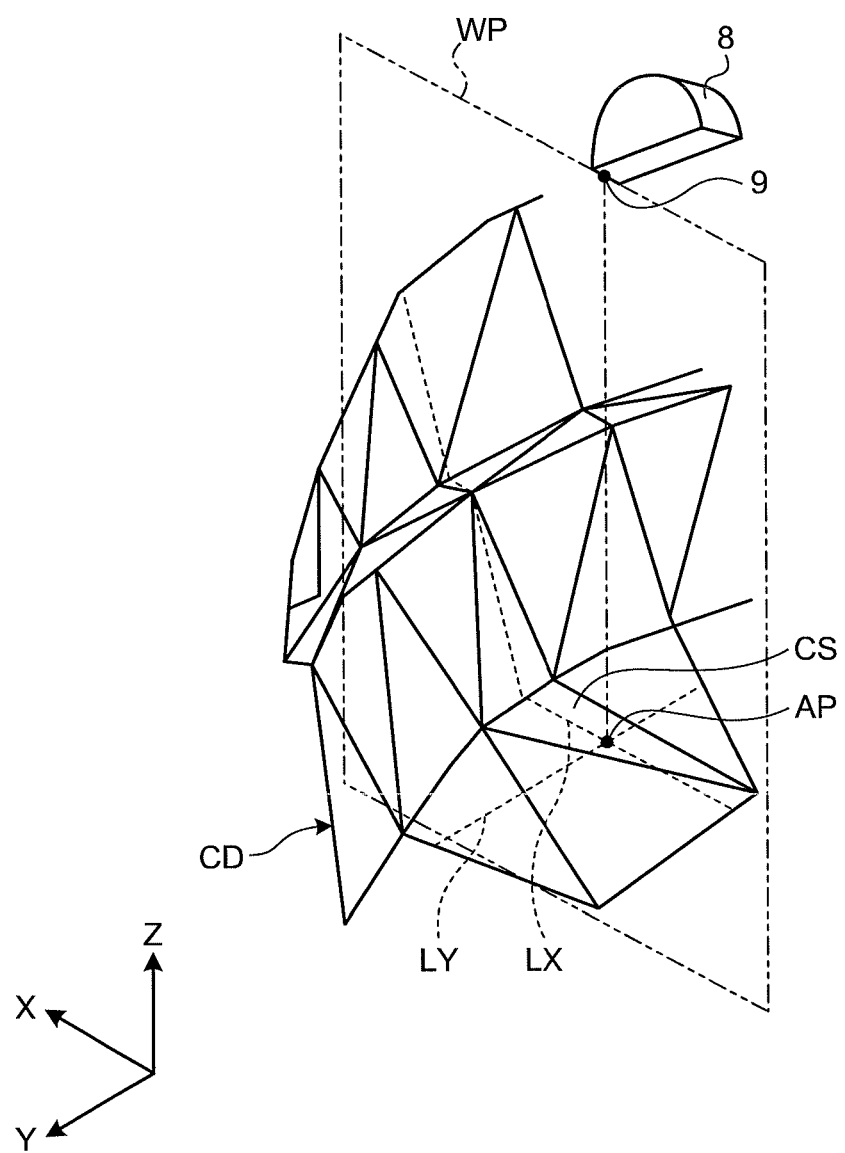
FIG. 14 is a schematic diagram illustrating an example of target construction data according to the embodiment.

FIG. 14 is a schematic diagram illustrating an example of target construction data CD according to the embodiment. As illustrated in FIG. 14, the target construction data CD indicates a target ground shape of a construction area. The target ground shape includes a plurality of target construction ground shapes CS expressed by a triangular polygon. Each of the plurality of target construction ground shapes CS indicates the target shape of the excavation target in the working device 1. In the target construction data CD, a point AP having the closest perpendicular distance with respect to the bucket 8 in the target construction ground shape CS is defined. Further, in the target construction data CD, a working device operation plane WP which is orthogonal to the bucket axis AX3 along the point AP and the bucket 8 is defined. The working device operation plane WP is an operation plane in which the tip 9 of the bucket 8 moves by the operation of at least one of the boom cylinder 11, the arm cylinder 12, and the bucket cylinder 13 and is parallel to the XZ plane. The regulation point position data calculation unit 53A calculates the position data of the regulation point RP defined at a position having the closest perpendicular distance with respect to the point AP of the target construction ground shape CS based on the target construction ground shape CS and the external shape data of the bucket 8.

The target construction ground shape generation unit 54 acquires a line LX which is an intersection line between the working device operation plane WP and the target construction ground shape CS. Further, the target construction ground shape generation unit 54 acquires a line LY which passes through a point AP and intersects the line LX in the target construction ground shape CS. The line LY indicates an intersection line between a lateral operation plane and the target construction ground shape CS. The lateral operation plane indicates a plane which is orthogonal to the working device operation plane WP and passes through the point AP. The line LY extends in the lateral direction of the bucket 8 in the target construction ground shape CS.

Figure 15:
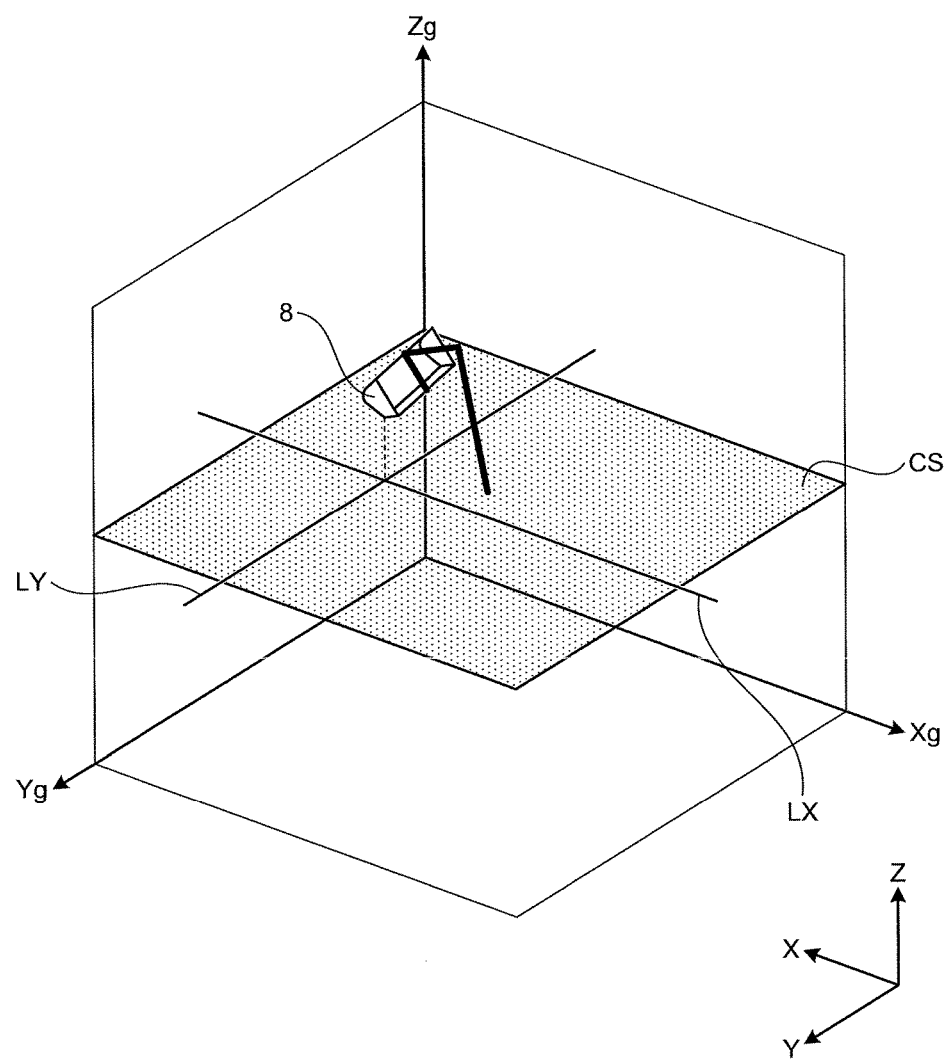
FIG. 15 is a schematic diagram illustrating an example of a target construction ground shape according to the embodiment.

FIG. 15 is a schematic diagram illustrating an example of the target construction ground shape CS according to the embodiment. The target construction ground shape generation unit 54 acquires the line LX and the line LY and generates the target construction ground shape CS which indicates the target shape of the excavation target based on the lines LX and LY. When the target construction ground shape CS is excavated by the bucket 8, the control device 50 moves the bucket 8 along the line LX which is an intersection line between the target construction ground shape CS and the working device operation plane WP passing through the bucket 8.

The working device operation plane calculation unit 55 calculates the working device operation plane WP which is orthogonal to at least one of the boom axis AX1, the arm axis AX2, and the bucket axis AX3 and passes through the bucket 8 as described above with reference to FIGS. 14 and 15 based on the vehicle body position data and the working device angle data.

The tilting operation plane calculation unit 56 calculates the tilting operation plane TP which is orthogonal to the tilting axis AX4 and passes through the bucket 8.

Figure 16:
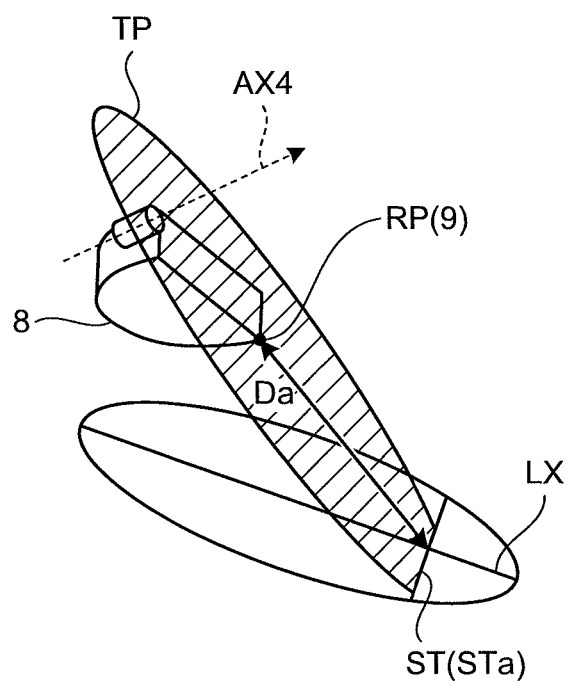
FIG. 16 is a schematic diagram illustrating an example of a tilting operation plane according to the embodiment.

FIG. 16 is a schematic diagram illustrating an example of the tilting operation plane TP according to the embodiment. FIG. 16 illustrates the tilting operation plane TP when the tilting axis AX4 is not parallel to the target construction ground shape CS.

As illustrated in FIG. 16, the tilting operation plane TP indicates an operation plane which is orthogonal to the tilting axis AX4 and passes through the regulation point RP set in the bucket 8. FIG. 16 illustrates the tilting operation plane TP which passes through the regulation point RP set in the tip 9. The tilting operation plane TP is an operation plane in which the regulation point RP of the bucket 8 (the tip 9) moves by the operation of the tilting cylinder 14. When at least one of the boom cylinder 11, the arm cylinder 12, and the bucket cylinder 13 is operated so that a tilting axis angle ε indicating a direction of the tilting axis AX4 changes, the inclination of the tilting operation plane TP also changes.

As described above, the working device angle calculation device 24 can calculate the tilting axis angle ε which indicates the inclination angle of the tilting axis AX4 with respect to the XY plane. The tilting axis angle is acquired by the working device angle data acquisition unit 52. Further, the position data of the regulation point RP is calculated by the regulation point position data calculation unit 53A. The tilting operation plane calculation unit 56 can calculate the tilting operation plane TP based on the tilting axis angle ε of the tilting axis AX4 acquired by the working device angle data acquisition unit 52 and the position of the regulation point RP calculated by the regulation point position data calculation unit 53A.

When the tilting operation plane TP is calculated, an operation distance Da indicating the distance between the regulation point RP of the bucket 8 and the tilting target ground shape ST is calculated. A detailed description will be made below.

The tilting target ground shape calculation unit 57 calculates the tilting target ground shape ST in which the target construction ground shape CS and the tilting operation plane TP intersect each other. As illustrated in FIG. 16, the tilting target ground shape ST is indicated by an intersection line between the target construction ground shape CS and the tilting operation plane T. When the tilting axis angle ε which is a direction of the tilting axis AX4 changes, a position of the tilting target ground shape ST changes.

The working device target speed determination unit 58 determines a target speed Vb of the boom 6 during the stop assisting control based on a distance between the bucket 8 and the target construction ground shape CS. In the embodiment, the working device target speed determination unit 58 determines the target speed Vb of the boom 6 in the working device operation plane WP (the YZ plane) based on the perpendicular distance Db which is the shortest distance between the line LX and the bucket 8 in the normal direction of the line LX.

Figure 17:
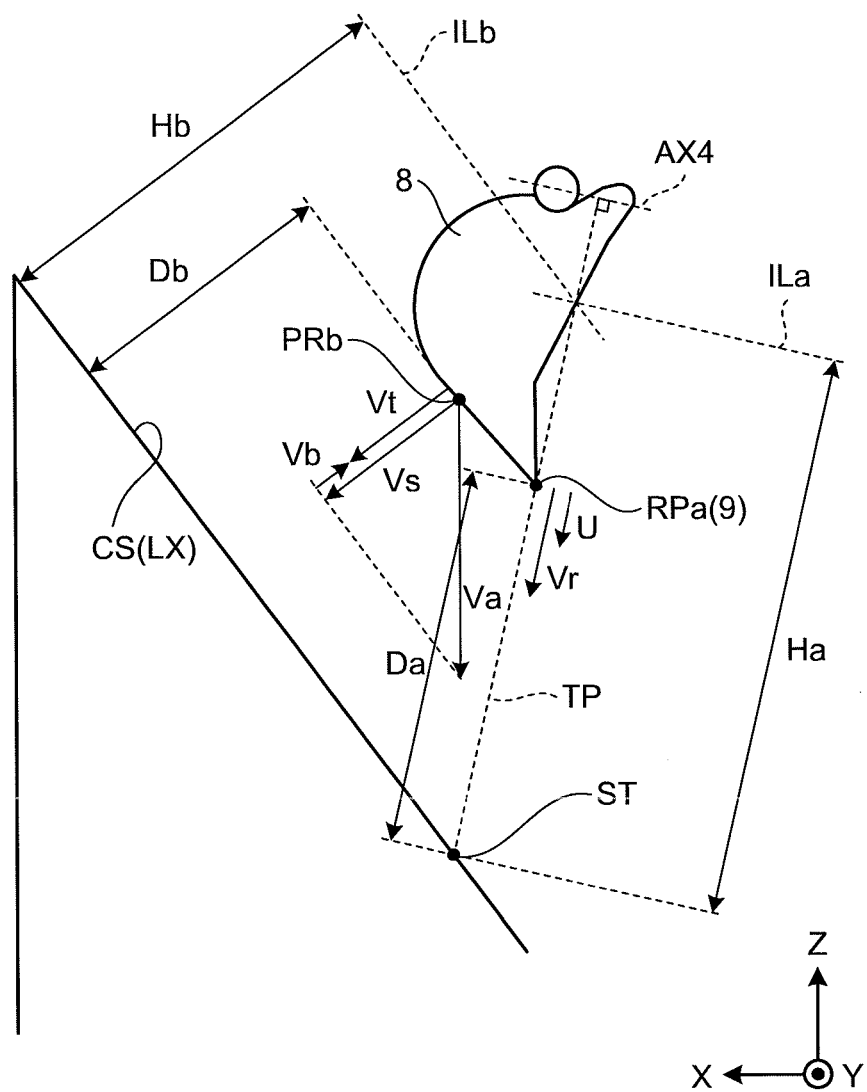
FIG. 17 is a schematic diagram illustrating an example of a method of controlling an excavator according to the embodiment.

FIG. 17 is a schematic diagram illustrating a tilting stop control which is an example of the stop assisting control and the tilting control according to the embodiment. In the stop assisting control described in FIG. 17, a control is performed based on a regulation point RPb and a regulation point during the tilting stop control is used as a regulation point RPa for convenience of description. However, the regulation point RPb and the regulation point RPa may be considered as the same regulation point RP. First, the stop assisting control will be described. As illustrated in FIG. 17, the line LX is defined and the speed restriction intervention line ILb is defined. The speed restriction line ILb is parallel to the line LX and is defined at a position separated from the line LX by a line distance Hb. It is desirable to set the line distance Hb so that the manipulation feeling of the operator is not damaged.

The working device target speed determination unit 58 acquires the perpendicular distance Db which is the shortest distance between the line LX and the bucket 8 in the normal direction of the target construction ground shape CS. In the example illustrated in FIG. 17, the perpendicular distance Db is defined between the line LX and the regulation point RPb of the outer face of the bucket 8. Further, the working device target speed determination unit 58 acquires a speed of the working device 1 corresponding to a speed of the bucket 8 at the regulation point RPb of the bucket 8 in response to the perpendicular distance Db as a working device target speed Vt.

Figure 18:
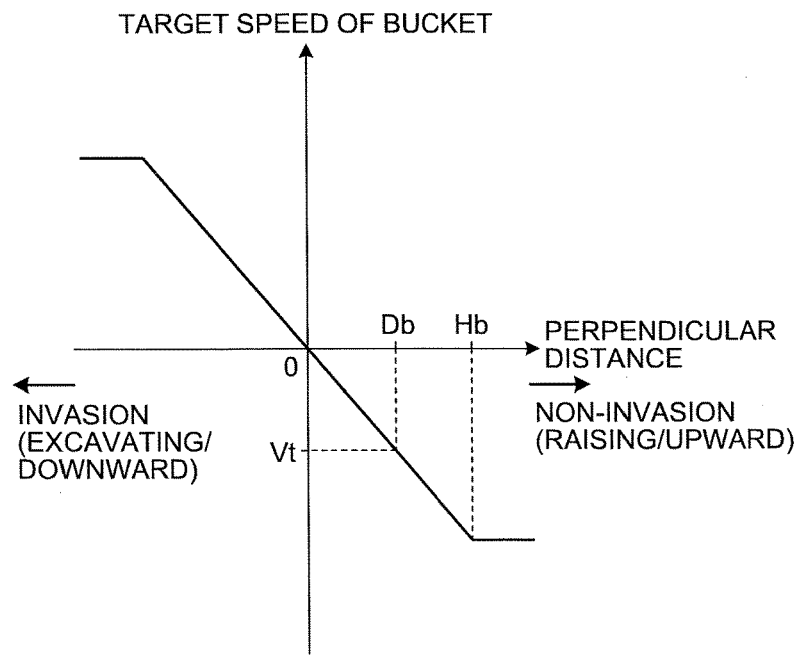
FIG. 18 is a diagram illustrating an example of a relation between a target speed and a perpendicular distance according to the embodiment.

FIG. 18 is a diagram illustrating an example of a relation between the perpendicular distance Db and the working device target speed Vt at the regulation point RPb of the bucket 8 according to the embodiment. As illustrated in FIG. 18, the working device target speed Vt is a speed which is uniformly determined in response to the perpendicular distance Db. The working device target speed Vt is not set when the perpendicular distance Db is longer than the line distance Hb and is set when the perpendicular distance Db is equal to or shorter than the line distance Hb. As the perpendicular distance Db becomes shorter, the working device target speed Vt becomes lower. When the perpendicular distance Db becomes zero, the working device target speed Vt also becomes zero. The perpendicular distance Db obtained when the bucket 8 does not invade the target construction ground shape CS is a positive value. The perpendicular distance Db obtained when the bucket 8 invades the target construction ground shape CS is a negative value. The non-invasion state in which the bucket 8 does not invade the target construction ground shape CS indicates a state where the bucket 8 exists above the target construction ground shape CS, that is, the bucket exists at a position not exceeding the target construction ground shape CS. The invasion state where the bucket 8 invades the target construction ground shape CS indicates a state where the bucket 8 exists below the target construction ground shape CS, that is, the bucket exists at a position exceeding the target construction ground shape CS. In the non-invasion state, the bucket 8 is raised from the target construction ground shape CS. Then, in the invasion state, the bucket 8 excavates the target construction ground shape CS. The perpendicular distance Db obtained when the regulation point RPb of the bucket 8 matches the target construction ground shape CS becomes zero.

In the embodiment, a speed in which the bucket 8 moves upward from the lower side of the target construction ground shape CS is set to a positive value and a speed in which the bucket 8 moves downward from the upper side of the target construction ground shape CS is set to a negative value. That is, a speed in which the bucket 8 moves toward the upper side of the target construction ground shape CS is set to a positive value and a speed in which the bucket 8 moves toward the lower side of the target construction ground shape CS is set to a negative value.

The working device target speed determination unit 58 determines the positive or negative value of the working device target speed Vt of the bucket 8 so that the regulation point RPb of the bucket 8 does not invade the target construction ground shape CS. Further, the working device target speed determination unit 58 determines the working device target speed Vt of the bucket 8 so that an absolute value of the working device target speed Vt of the bucket 8 becomes larger as the perpendicular distance Db becomes longer and the absolute value of the working device target speed Vt of the bucket 8 becomes smaller as the perpendicular distance Db becomes shorter.

The working device target speed determination unit 58 calculates a movement speed Va at the regulation point RPb of the bucket 8 based on the manipulation amount of the manipulation device 30. In the embodiment, when the manipulation device 30 is manipulated, the movement speed Va of the bucket 8 based on the manipulation of the manipulation device 30 is calculated on the basis of detection values of the pressure sensors 34A and 34B. As described above with reference to FIG. 9, when the manipulation device 30 is manipulated, the pilot pressure values of the oil passages 33A and 33B change in response to the manipulation amount of the left working device manipulation lever 30L. The storage unit 62 stores correlation data indicating a correlation between the pilot pressure set in response to the manipulation of the lever and the movement amounts of the spool and the cylinder. The correlation data is given data defined by a table or a correlation equation. The working device target speed determination unit 58 also calculates a speed of the arm cylinder in response to the manipulation of the lever in the same way. After a cylinder speed of the arm cylinder 12 and a cylinder speed of the bucket cylinder 13 are calculated, the working device target speed determination unit 58 converts the cylinder speed of the arm cylinder 12 and the cylinder speed of the bucket cylinder 13 into the movement speed Va at the regulation point RP.

The working device target speed determination unit 58 calculates a relative speed Vs of the regulation point RPb with respect to the target construction ground shape CS from the calculated movement speed Va of the regulation point RPb of the bucket 8. The relative speed Vs is a relative speed between the target construction ground shape CS and the bucket 8 in the normal direction of the target construction ground shape CS. In other words, the relative speed Vs indicates a movement speed when the regulation point RPb moves toward the target construction ground shape CS.

The working device target speed determination unit 58 determines the target speed Vb at the regulation point Rb in accordance with the rotation of the boom 6 in the working device operation plane WP so that the actual relative speed of the bucket 8 with respect to the target construction ground shape CS becomes the working device target speed Vt based on the relative speed Vs calculated from the pilot pressure changing in response to the manipulation amount of the working device manipulation lever 30L and the working device target speed Vt of the bucket 8 determined based on the perpendicular distance Db. That is, the target speed Vb of the boom 6 is determined so that the relative speed Vs of the bucket 8 based on the operation of at least one of the arm cylinder 12 and the bucket cylinder 13 is canceled by the movement of the boom 6 and the bucket 8 moves at the working device target speed Vt when at least one of the arm cylinder 12 and the bucket cylinder 13 is operated by the manipulation of the working device manipulation lever 30L. In the embodiment, a configuration is described in which the target speed Vb of the boom 6 is changed, but a configuration may be used in which the target speed of another working device such as the arm 7 is changed.

The working device control instruction determination unit 60 outputs an instruction for driving the working device 1 in the working device operation plane WP which is orthogonal to the boom axis AX1, the arm axis AX2, and the bucket axis AX3 based on an operation state of at least one of the arm 7 and the bucket 8 and a distance between the bucket 8 and the target construction ground shape CS. The working device control instruction determination unit 60 outputs an instruction for driving the boom 6 in the working device operation plane WP based on the target speed Vb of the boom 6 in the working device operation plane WP determined by the working device target speed determination unit 58. That is, the working device control instruction determination unit 60 outputs an instruction for driving the boom cylinder 11 that drives the boom 6 in the working device operation plane WP based on the target speed Vb of the boom 6 determined by the working device target speed determination unit 58. In the embodiment, as described above with reference to FIG. 10, the working device control instruction determination unit 60 outputs a control signal to the control valve 39C. Since the control valve 39C is controlled so that the pilot pressure of the oil passage 33C is controlled, the movement of the spool of the flow rate control valve 25 is adjusted. When the movement of the spool is adjusted, the cylinder speed of the boom cylinder 11 that drives the boom 6 is adjusted. When the cylinder speed of the boom 11 is adjusted, the movement speed of the boom 6 is adjusted. The working device control instruction determination unit 60 outputs a control signal to the control valve 39C so that the movement speed of the boom 6 becomes the target speed Vb.

Next, the tilting stop control will be described. The tilting target speed determination unit 59 determines the tilting speed of the bucket 8 during the tilting stop control as the tilting target speed (the tilting restriction speed) U based on the distance between the bucket 8 and the target construction ground shape CS. In the embodiment, the tilting target speed determination unit 59 determines the target speed U of the bucket 8 on the tilting operation plane TP based on the operation distance Da which is a distance between the bucket 8 and the tilting target ground shape ST. In the embodiment, a control based on the operation distance Da will be described, but a control based on the perpendicular distance Db may be performed.

The tilting target speed determination unit 59 determines the target speed U for the tilting speed of the bucket 8 based on the operation distance Da. The tilting target speed determination unit 59 restricts the tilting speed when the operation distance Da is equal to or shorter than a line distance Ha which is a threshold value. In the description below, the target speed U for the tilting speed of the bucket 8 will be appropriately referred to as a restriction speed U.

FIG. 17 is a schematic diagram illustrating the tilting stop control according to the embodiment. As illustrated in FIG. 17, the tilting target ground shape ST is defined and the speed restriction intervention line ILa is defined. The speed restriction line ILa is parallel to the tilting target ground shape ST and is defined at a position separated from the tilting target ground shape ST by the line distance Ha. It is desirable to set the line distance Ha so that the manipulation feeling of the operator is not damaged. The tilting control instruction determination unit 61 restricts the tilting speed of the bucket 8 when at least a part of the tilting bucket 8 exceeds the speed restriction intervention line ILa so that the operation distance Da becomes equal to or shorter than the line distance Ha. The tilting target speed determination unit 59 determines the restriction speed U for the tilting speed of the bucket 8 which exceeds the speed restriction intervention line ILa. In the example illustrated in FIG. 17, since a part of the bucket 8 exceeds the speed restriction intervention line ILa so that the operation distance Da is shorter than the line distance Ha, the tilting speed is restricted.

The tilting target speed determination unit 59 acquires the operation distance Da between the tilting target ground shape ST and the regulation point RP in a direction parallel to the tilting operation plane TP. Further, the tilting target speed determination unit 59 acquires the restriction speed U in response to the operation distance Da. When the tilting control instruction determination unit 61 determines that the operation distance Da is equal to or shorter than the line distance Ha, the tilting speed is restricted. In the embodiment, the operation distance Da indicates a distance between the tip 9 and the tilting target ground shape ST.

Figure 19:
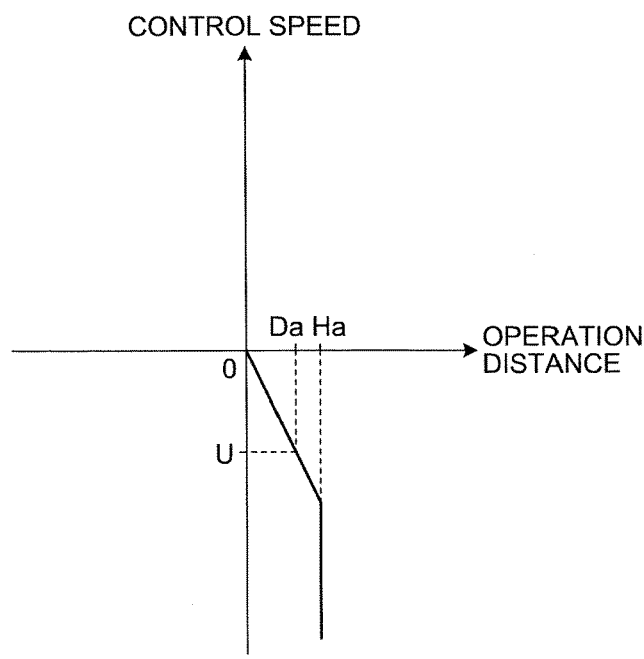
FIG. 19 is a diagram illustrating an example of a relation between a restriction speed and an operation distance according to the embodiment.

FIG. 19 is a diagram illustrating an example of a relation between the operation distance Da and the restriction speed U according to the embodiment. As illustrated in FIG. 19, the restriction speed U is a speed which is uniformly determined in response to the operation distance Da. The restriction speed U is not set when the operation distance Da is longer than the line distance Ha and is set when the operation distance Da is equal to or shorter than the line distance Ha. The restriction speed U becomes lower as the operation distance Da becomes shorter. Then, when the operation distance Da becomes zero, the restriction speed U also becomes zero. Furthermore, in FIG. 19, a direction moving closer to the target construction ground shape CS is indicated by a negative direction.

Figure 20:
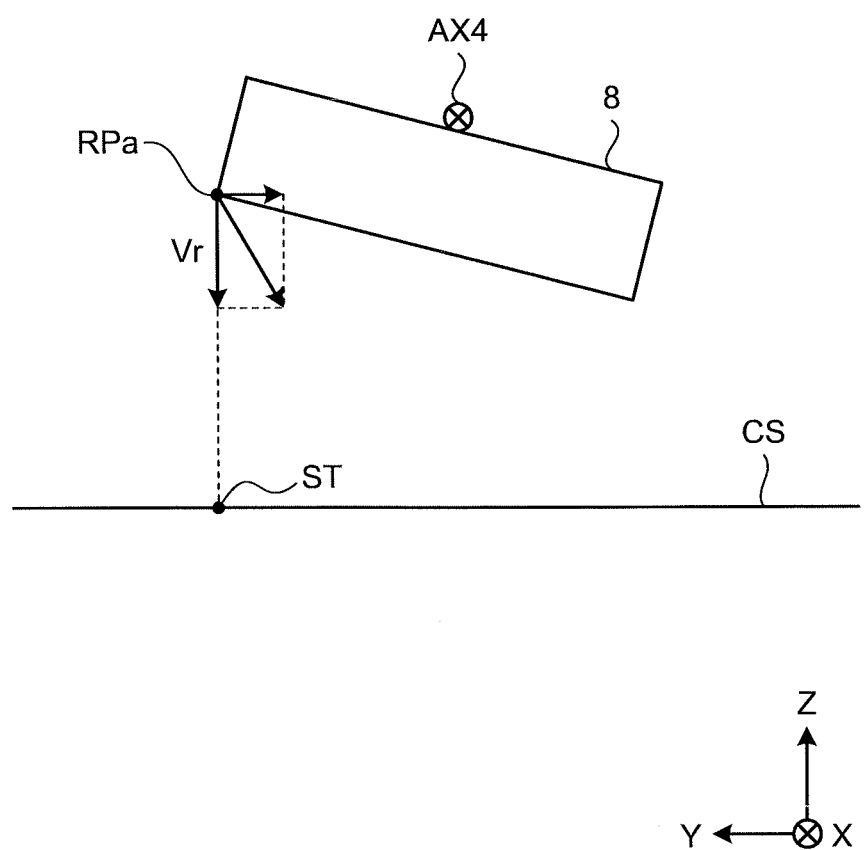
FIG. 20 is a diagram illustrating an example of a relation between a restriction speed and an operation distance according to the embodiment.

FIG. 20 is a schematic diagram illustrating an example of an operation of the bucket 8 according to the embodiment. The tilting target speed determination unit 59 calculates a movement speed Vr in a direction in which the tip 9 which is the regulation point RPa moves toward the target construction ground shape CS (the tilting target ground shape ST) in accordance with the tilting based on the manipulation amount of the tilting manipulation lever 30T of the manipulation device 30. The movement speed Vr indicates a movement speed of the regulation point RPa within a plane parallel to the tilting operation plane TP. The movement speed Vr indicates a speed component which is perpendicular to the tilting target ground shape ST. The movement speed Vr is calculated for each of the plurality of regulation points RP including the tip 9 (the regulation point RPa).

In the embodiment, when the tilting manipulation lever 30T is manipulated, the movement speed Vr is calculated based on a signal such as a voltage output from the tilting manipulation lever 30T. When the tilting manipulation lever 30T is manipulated, a signal such as a voltage in response to the manipulation amount of the tilting manipulation lever 30T is output from the tilting manipulation lever 30T. After the cylinder speed of the tilting cylinder 14 is calculated, the tilting target speed determination unit 59 converts the cylinder speed into the movement speed Vr of the regulation point RPa of the bucket 8 corresponding to the manipulation amount of the manipulation lever.

The tilting control instruction determination unit 61 outputs an instruction for performing the tilting control of the bucket 8 about the tilting axis AX4 based on the distance between the bucket 8 and the target construction ground shape CS and the tilting state of the bucket 8. When the tilting control instruction determination unit 61 determines that the operation distance Da is equal to or shorter than the line distance Ha, the movement speed Vr of the regulation point RP in the target construction ground shape CS is regulated at the restriction speed U. The tilting control instruction determination unit 61 outputs a control signal to the control valve 37 in order to suppress the movement speed Vr of the tip 9 of the bucket 8. The tilting control instruction determination unit 61 outputs a control signal to the control valve 37 so that the movement speed Vr of the tip 9 of the bucket 8 becomes the restriction speed U in response to the operation distance Da. Accordingly, the movement speed of the tip 9 of the tilting bucket 8 becomes slower as the tip 9 becomes closer to the target construction ground shape CS (the tilting target ground shape ST) and becomes zero when the tip 9 reaches the target construction ground shape CS.

[Control Method]

Figure 21:
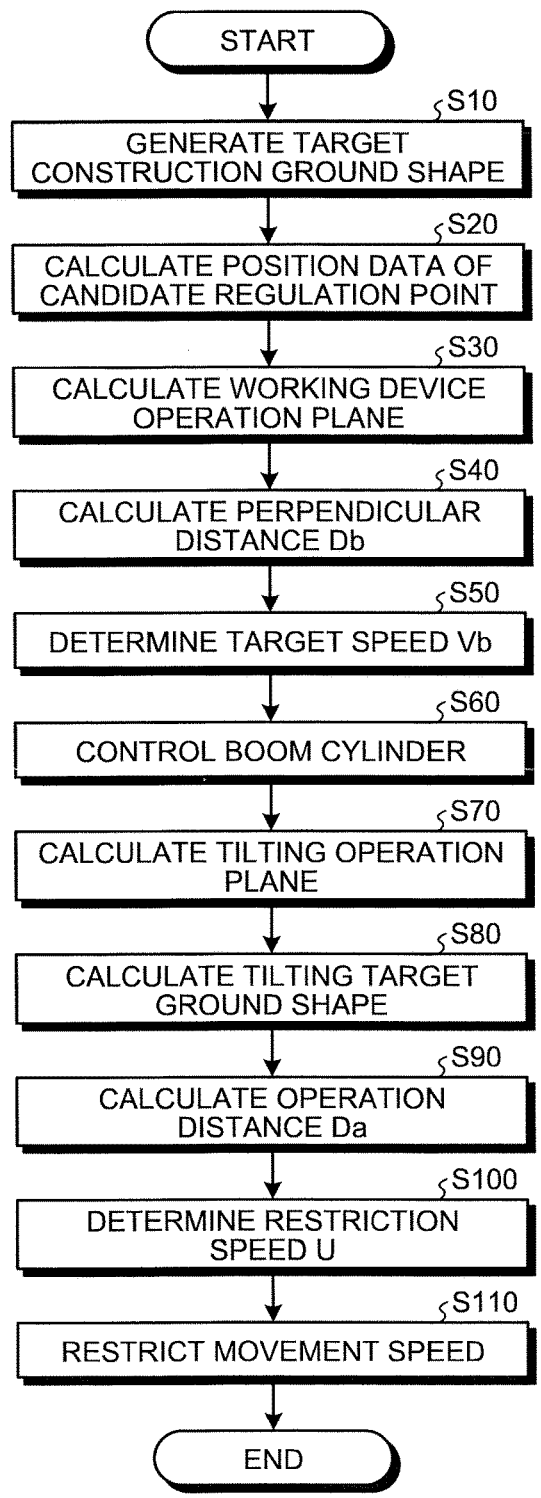
FIG. 21 is a flowchart illustrating an example of a method of controlling the excavator according to the embodiment.

Next, an example of a method of controlling the excavator 100 according to the embodiment will be described. FIG. 21 is a flowchart illustrating an example of the method of controlling the excavator 100 according to the embodiment. In the embodiment, an example will be described in which the inclined target construction ground shape CS is constructed by the tiltable bucket 8.

The target construction ground shape generation unit 54 generates the target construction ground shape CS based on the line LX and the line LY which correspond to the target construction data supplied from the target construction data generation device 70 and stored in the storage unit 62 (step S10).

The regulation point position data calculation unit 53A calculates the position data of each regulation point RP set in the bucket 8 based on the working device angle data acquired by the working device angle data acquisition unit 52, the working device data stored in the storage unit 62, and the target construction ground shape CS (step S20).

The working device operation plane calculation unit 55 calculates the working device operation plane WP which is an operation plane in which the bucket 13 moves by the operation of at least one of the boom cylinder 11, the arm cylinder 12, and the bucket cylinder 13 (step S30).

The working device target speed determination unit 58 calculates the perpendicular distance Db between the regulation point RP (RPb) and the target construction ground shape CS (step S40).

The target speed Vb is determined based on the perpendicular distance Db. When the perpendicular distance Db is equal to or shorter than the line distance Hb, the working device target speed determination unit 58 determines the target speed Vb of the boom 6 for setting the movement speed of the bucket 8 to the working device target speed Vt (step S50).

The working device control instruction determination unit 60 controls the cylinder speed of the boom cylinder 11 by outputting a control signal to the control valve 39C in order to operate the boom 6 at the target speed Vb (step S60). Accordingly, the stop assisting control is performed.

The tilting operation plane calculation unit 56 calculates the tilting operation plane TP which is orthogonal to the tilting axis AX4 and passes through the tip 9 corresponding to the regulation point RPa (step S70).

The tilting target ground shape calculation unit 57 calculates the tilting target ground shape ST in which the target construction ground shape CS and the tilting operation plane TP intersect each other (step S80).

The tilting target speed determination unit 59 calculates the operation distance Da between the tip 9 and the tilting target ground shape ST (step S90).

The restriction speed U is determined based on the operation distance Da. When the operation distance Da is equal to or shorter than the line distance Ha, the tilting target speed determination unit 59 determines the restriction speed U in response to the operation distance Da (step S100).

The tilting control instruction determination unit 61 calculates a control signal for the control valve 37 based on the movement speed Vr of the tip 9 of the bucket 8 calculated from the manipulation amount of the tilting manipulation lever 30T and the restriction speed U determined by the tilting target speed determination unit 59. The tilting control instruction determination unit 61 calculates a control signal for setting the movement speed Vr at the restriction speed U and outputs the control signal to the control valve 37. The control valve 37 controls the pilot pressure based on the control signal output from the tilting control instruction determination unit 61. Accordingly, the movement speed Vr of the tip 9 of the bucket 8 is restricted (step S110).

[Effect]

As described above, according to the embodiment, the stop assisting control which is performed by an instruction for driving the working device 1 in the working device operation plane WP orthogonal to at least one of the boom axis AX1, the arm axis AX2, and the bucket axis AX3 is performed along with the tilting stop control which is performed by an instruction for tilting the bucket 8 about the tilting axis AX4. A case in which the operator constructs an inclined plane by using the tilting stop control and the stop assisting control will be described with reference to FIG. 22.

The operator performs a task according to a procedure below while manipulating the arm and the bucket for the excavating operation so that a bucket excavation face is pressed against the target construction ground shape CS during the tilting operation. As illustrated in FIG. 22(A), when the bucket 8 moves closer to the target construction ground shape CS, an intervention control for the boom 6 based on the stop assisting control is performed in accordance with the manipulation of the arm 7 and the bucket 8 and the tilting stop control is smoothly started in accordance with the manipulation of the bucket 8 as illustrated in FIG. 22(B).

When the arm 7 and the bucket 8 are continuously operated along with the tilting operation, as illustrated in FIG. 22(C), the bucket 8 reaches the target construction ground shape CS. The tilting speed becomes zero at a time point in which the tip (the line) 9 of the bucket 8 contacting the target construction ground shape CS or the excavation area of the rear face of the bucket 8 is substantially parallel to the target construction ground shape CS (the tilting target ground shape ST in the tilting stop control) during the excavation using the bucket 8. Next, a state in which the target construction ground shape CS and the excavation area are parallel to each other is kept by the tilting stop control. At this time, in the stop assisting control, a boom intervention control is performed without considering the tilting operation and an excavating operation is performed along the target construction ground shape CS (the line LX in the stop assisting control).

Accordingly, the excavation area of the bucket is not raised from the target construction ground shape CS while the target construction ground shape CS and the excavation area are continuously parallel to each other.

When the operator performs an excavating operation including an operation in which the excavation area of the bucket 8 is pressed against the target construction ground shape CS while the bucket 8 is tilted in accordance with the manipulation of the manipulation device 30, there is a need to faithfully perform the excavating operation so that only the target construction ground shape CS is not invaded by the bucket. If only a part of the bucket 8 moves along the line LX, the optimal value of the tilting angle of the bucket 8 with respect to the target construction ground shape CS cannot be determined and only a part of the tip contacts the target construction ground shape CS or is raised from the target construction ground shape CS. As a result, an excavation leakage (non-excavation) occurs.

According to the embodiment, the stop assisting control is performed along with the tilting stop control of controlling the tilting cylinder 14 based on the distance between the bucket 8 and the tilting target ground shape ST instead of a configuration in which the stop assisting control of controlling the boom cylinder 11 is just applied to the tilting type bucket 8. Accordingly, since the tilting angle of the tilting type bucket 8 can be set to an optimal value and the tip 9 of the bucket 8 can be parallel to the target construction ground shape CS, the tip 9 of the bucket 8 can be moved along the target construction ground shape CS (the line LX) while the target construction ground shape CS (the tilting target ground shape ST) is not invaded by the bucket 8.

Figure 23:
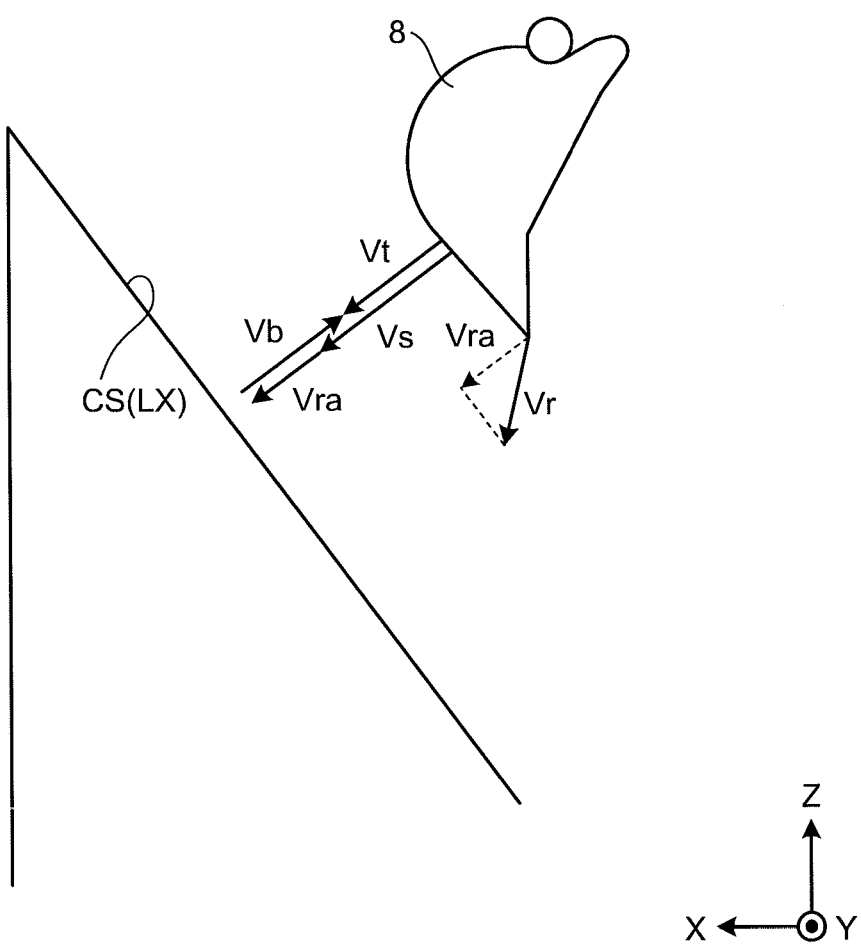
FIG. 23 is a schematic diagram illustrating an action of the bucket according to the embodiment.

FIG. 23 is a schematic diagram illustrating an action of the bucket 8 according to the embodiment. FIG. 23 illustrates an example in which the stop assisting control is performed and the tilting stop control is not performed. When the tilting stop control is not performed, the restriction speed U is not calculated. On the assumption that the movement speed of the bucket 8 based on the manipulation of the tilting manipulation lever 30T of the operator is Vr and the speed component of the movement speed Vr in the normal direction of the target construction ground shape CS is Vra, the relative speed of the bucket 8 with respect to the target construction ground shape CS becomes a sum of the movement speed Vs of the bucket 8 based on the manipulation of the working device manipulation lever 30L of the operator and the movement speed Vra of the bucket 8 based on the manipulation of the tilting manipulation lever 30T of the operator. As a result, the working device target speed determination unit 58 calculates the target speed Vb of the boom 6 so that the sum of the movement speed Vs and the movement speed Vra is canceled. That is, even when the bucket 8 is tilted, the tilting cylinder 14 is not controlled and only the boom cylinder 11 is controlled. Accordingly, the boom 6 is excessively raised. As a result, it is difficult to move the tip 9 of the bucket 8 along the inclined target construction ground shape CS.

According to the embodiment, the tilting cylinder 14 is controlled based on the movement speed Vr of the tilting bucket 8. Thus, since it is possible to suppress the boom 6 from being excessively raised, the target construction ground shape CS is constructed with high precision.

Further, in the embodiment, the tilting operation plane TP and the tilting target ground shape ST are defined and the tilting target speed determination unit 59 determines the target speed U of the bucket 8 in the tilting operation plane ST based on the operation distance Da between the bucket 8 and the tilting target ground shape ST. The tilting control instruction determination unit 61 controls the tilting cylinder 14 based on the target speed U determined by the tilting target speed determination unit 59. Thus, it is possible to perform a construction while causing the tip 9 of the tilting bucket 8 to follow the tilting target construction ground shape CS with high precision.

Further, in the embodiment, the stop assisting control of controlling the movement of the working device 1 in the working device operation plane WP and the tilting stop control of controlling the tilting of the bucket 3 in the tilting operation plane TP are performed independently. That is, in the stop assisting control, the target speed Vb of the boom 6 in the working device operation plane WP is determined based on the perpendicular distance Db in the working device operation plane WP and the boom cylinder 11 is controlled so that the boom 6 moves at the target speed Vb. That is, the relative speed between the target construction ground shape CS and the bucket 8 based on the tilting of the bucket 8 is not reflected in the stop assisting control. Meanwhile, in the tilting stop control, the target speed U of the bucket 8 in the tilting operation plane TP is determined based on the operation distance Da in the tilting operation plane TP and the tilting cylinder 14 is controlled so that the bucket 8 is tilted at the target speed U. That is, the relative speed between the target construction ground shape CS and the bucket 8 based on the movement of the boom 6 is not reflected in the tilting stop control. Accordingly, it is possible to perform a construction while causing the tip 9 of the tilting bucket 8 to follow the tilted target construction ground shape CS with high precision.

Second Embodiment

Figure 24:
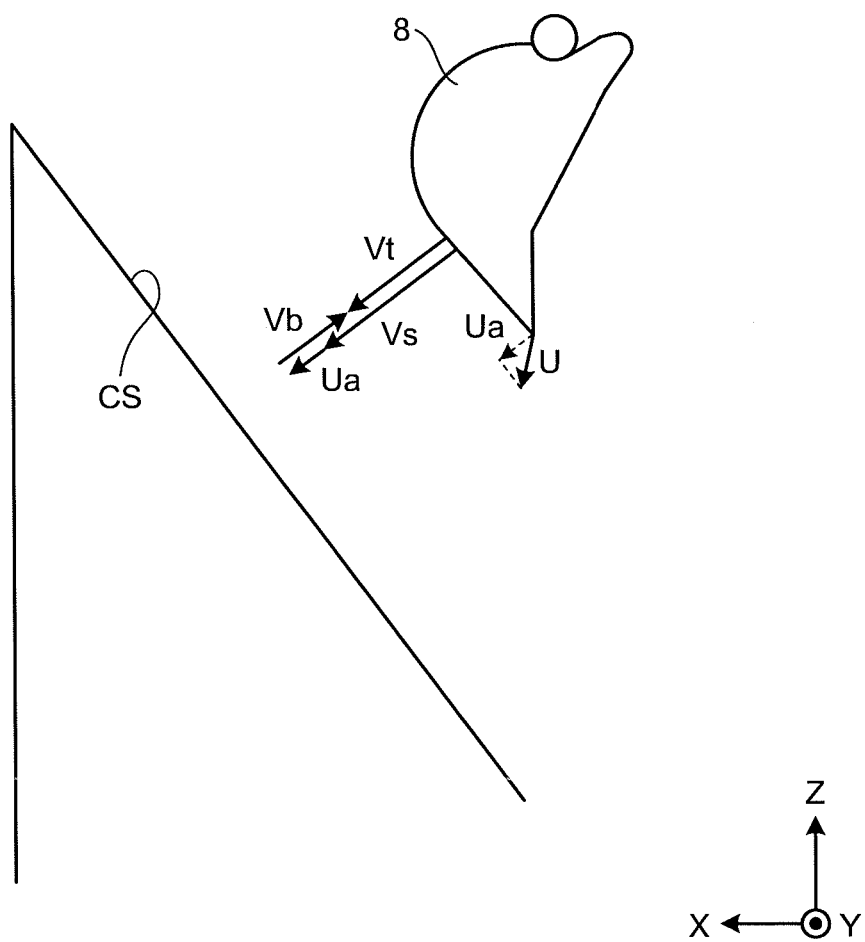
FIG. 24 is a schematic diagram illustrating an example of a method of controlling the excavator according to the embodiment.

Next, a second embodiment will be described. FIG. 24 is a schematic diagram illustrating an example of a method of controlling the excavator 100 according to the embodiment. As in the above-described embodiment, the tilting target speed determination unit 59 calculates the target speed U of the bucket 8 in the tilting operation plane TP.

In the embodiment, the tilting target speed determination unit 59 calculates a target speed Ua of the bucket 8 in the normal direction of the line LX from the calculated target speed U. That is, the tilting target speed determination unit 59 calculates the speed component Ua of the target speed U in the normal direction of the line LX.

The working device control instruction determination unit 60 outputs an instruction based on the target speed Ua of the bucket 8 in the normal direction of the line LX calculated by the tilting target speed determination unit 59 and the target speed Vs of the bucket 8 in the normal direction of the line LX calculated by the working device target speed determination unit 58. In the embodiment, the target speed Vb of the boom 6 is calculated so that a sum of the target speed Ua and the target speed Vs is cancelled, that is, a relation of "Vs+Va=Vt+Vb" is established and the working device control instruction determination unit 60 outputs a control signal to the control valve 39C so that the boom 6 moves at the target speed Vb. In this way, the cylinder speed of the boom cylinder 11 is controlled.

According to the embodiment, the target speed Ua for the tilting of the bucket 8 is reflected in the stop assisting control. When a speed in which the bucket 8 approaches the target construction ground shape CS is not reflected in the stop assisting control based on the tilting, there is a possibility that the bucket 8 may slightly excavate the target construction ground shape CS. According to the embodiment, it is possible to move the tip 9 of the bucket 8 along the target construction ground shape CS with higher precision.

Furthermore, in the above-described embodiment, the boom cylinder 11 is controlled in the stop assisting control. In the stop assisting control, the arm cylinder 12 that operates the working device 1 may be controlled in the working device operation plane WP or the boom cylinder 13 may be controlled therein.

Furthermore, in the above-described embodiment, a control for the tilting cylinder 14 that tilts the bucket 8 is performed based on the operation distance Da. A control for the tilting cylinder 14 that tilts the bucket 8 may be performed based on the perpendicular distance Db.

Furthermore, in the above-described embodiment, the bucket stop control of stopping the tilting of the bucket 8 in the target construction ground shape CS is performed. Similarly to the stop assisting control using the boom cylinder 11, the tilting stop assisting control of controlling the tilting bucket 14 may be performed so that the tip 9 of the bucket 8 follows the target construction ground shape CS.

Furthermore, in the above-described embodiment, the tilting bucket 8 is stopped at the tilting target ground shape ST. The tilting stop control may be performed so that the tilting of the bucket 8 is stopped at a regulation position which is different from the tilting target ground shape ST and has a regulation position relation with respect to the tilting target ground shape ST.

Furthermore, in the above-described embodiment, the construction machine 100 is an excavator. The components described in the above-described embodiment can be applied to a construction machine including a working device different from the excavator.

Furthermore, in the above-described embodiment, the working device 1 may be provided with a rotation axis rotatably supporting the bucket 8 in addition to the bucket axis AX3 and the tilting axis AX4.

Furthermore, in the above-described embodiment, the upper swinging body 2 may swing by a hydraulic pressure or power generated by an electric actuator. Further, the working device 1 may be operated by power generated by the electric actuator instead of the hydraulic cylinder 10.

REFERENCE SIGNS LIST

1 WORKING DEVICE
2 UPPER SWINGING BODY
3 LOWER TRAVELING BODY
3C CRAWLER
4 CAB
5 MACHINE ROOM
6 BOOM
7 ARM
8 BUCKET
8B BUCKET PIN
8T TILTING PIN
9 TIP
10 HYDRAULIC CYLINDER
10A CAP SIDE OIL CHAMBER
10B ROD SIDE OIL CHAMBER
11 BOOM CYLINDER
12 ARM CYLINDER
13 BUCKET CYLINDER
14 TILTING CYLINDER
16 BOOM STROKE SENSOR
17 ARM STROKE SENSOR
18 BUCKET STROKE SENSOR
19 TILTING STROKE SENSOR
20 POSITION CALCULATION DEVICE
21 VEHICLE BODY POSITION CALCULATOR
22 POSTURE CALCULATOR
23 ORIENTATION CALCULATOR
24 BUCKET POSITION CALCULATION DEVICE
25 FLOW RATE CONTROL VALVE
30 MANIPULATION DEVICE
30F MANIPULATION PEDAL
30L MANIPULATION LEVER
30T TILTING MANIPULATION LEVER
31 MAIN HYDRAULIC PUMP
32 PILOT HYDRAULIC PUMP
33A, 33B OIL PASSAGE
34A, 34B PRESSURE SENSOR
35A, 35B OIL PASSAGE
36A, 36B SHUTTLE VALVE
37A, 37B CONTROL VALVE
38A, 38B OIL PASSAGE
39A, 39B, 39C CONTROL VALVE
40 SHUTTLE VALVE
50 CONTROL DEVICE
51 VEHICLE BODY POSITION DATA ACQUISITION UNIT
52 BUCKET POSITION DATA ACQUISITION UNIT
53A REGULATION POINT POSITION DATA CALCULATION UNIT
53B CANDIDATE REGULATION POINT DATA CALCULATION UNIT
54 TARGET CONSTRUCTION GROUND SHAPE GENERATION UNIT
55 WORKING DEVICE OPERATION PLANE CALCULATION UNIT
56 TILTING OPERATION PLANE CALCULATION UNIT
57 TILTING TARGET GROUND SHAPE CALCULATION UNIT
58 WORKING DEVICE TARGET SPEED DETERMINATION UNIT
59 TILTING TARGET SPEED DETERMINATION UNIT
60 WORKING DEVICE CONTROL INSTRUCTION DETERMINATION UNIT
61 TILTING CONTROL INSTRUCTION DETERMINATION UNIT
62 STORAGE UNIT
63 INPUT/OUTPUT UNIT
70 TARGET CONSTRUCTION DATA GENERATION DEVICE
81 BOTTOM PLATE
82 REAR PLATE
83 UPPER PLATE
84 SIDE PLATE
85 SIDE PLATE
86 OPENING PORTION
87 BRACKET
88 BRACKET
90 CONNECTION MEMBER
91 PLATE MEMBER
92 BRACKET
93 BRACKET
94 FIRST LINK MEMBER
94P FIRST LINK PIN
95 SECOND LINK MEMBER
95P SECOND LINK PIN
96 BUCKET CYLINDER TOP PIN

97 BRACKET
100 EXCAVATOR (CONSTRUCTION MACHINE)
200 CONTROL SYSTEM
300 HYDRAULIC SYSTEM
AP POINT
AX1 BOOM AXIS
AX2 ARM AXIS
AX3 BUCKET AXIS
AX4 TILTING AXIS
CD TARGET CONSTRUCTION DATA
CS TARGET CONSTRUCTION GROUND SHAPE
L1 BOOM LENGTH
L2 ARM LENGTH
L3 BUCKET LENGTH
L4 TILTING LENGTH
L5 BUCKET WIDTH
LX LINE
LY LINE
RP REFERENCE POINT
RX SWING AXIS
ST TILTING TARGET GROUND SHAPE
TP TILTING OPERATION PLANE
α BOOM ANGLE
β ARM ANGLE
γ BUCKET ANGLE
δ TILTING ANGLE
ε TILTING AXIS ANGLE
θ1 ROLL ANGLE
θ2 PITCH ANGLE
θ3 YAW ANGLE

The invention claimed is:

1. A construction machine control system for a construction machine with a working device including a boom being rotatable about a boom axis with respect to a vehicle body, an arm being rotatable about an arm axis parallel to the boom axis with respect to the boom, and a bucket being rotatable about a bucket axis parallel to the arm axis and a tilting axis orthogonal to the bucket axis with respect to the arm, comprising:
   a target construction ground shape generation unit which generates a target construction ground shape indicating a target shape of an excavation target;
   a working device control instruction determination unit which outputs an instruction for driving the working device in a working device operation plane orthogonal to at least one of the boom axis, the arm axis, and the bucket axis based on an operation state of at least one of the arm and the bucket and a distance between the bucket and the target construction ground shape; and
   a tilting control instruction determination device which outputs an instruction for performing a tilting control of the bucket about the tilting axis based on a tilting state of the bucket and the distance between the bucket and the target construction ground shape.

2. The construction machine control system according to claim 1, further comprising:
   a tilting operation plane calculation unit which calculates a tilting operation plane which passes through the bucket and is orthogonal to the tilting axis;
   a tilting target ground shape calculation unit which calculates a tilting target ground shape in which the target construction ground shape and the tilting operation plane intersect each other; and
   a tilting target speed determination unit which determines a tilting target speed of the bucket in the tilting operation plane based on a distance between the bucket and the tilting target ground shape,
   wherein the tilting control instruction determination device outputs the instruction based on the tilting target speed.

3. The construction machine control system according to claim 2,
   wherein the tilting control instruction determination device outputs an instruction for driving a tilting cylinder that tilts the bucket based on the tilting target speed determined by the tilting target speed determination unit.

4. The construction machine control system according to claim 2,
   wherein the tilting target speed determination unit calculates the tilting target speed of the bucket in a normal direction of the target construction ground shape.

5. The construction machine control system according to claim 2, further comprising:
   a working device target speed determination unit which determines a working device target speed of the working device in the working device operation plane based on a perpendicular distance which is a shortest distance between the target construction ground shape and the bucket in the normal direction of the target construction ground shape,
   wherein the working device control instruction determination unit outputs an instruction for controlling at least one of the boom and the arm based on the working device target speed.

6. The construction machine control system according to claim 5,
   wherein the working device control instruction determination unit outputs an instruction for driving a hydraulic cylinder that drives at least one of the boom and the arm in the working device operation plane based on the working device target speed.

7. The construction machine control system according to claim 2,
   wherein the working device control instruction determination unit outputs the instruction based on the tilting target speed and the working device target speed.

8. A construction machine comprising:
   an upper swinging body;
   a lower traveling body which supports the upper swinging body;
   a working device which includes a boom, an arm, and a bucket and is supported by the upper swinging body; and
   the construction machine control system according to claim 1.

9. A construction machine control method of controlling a construction machine with a working device including a boom being rotatable about a boom axis with respect to a vehicle body, an arm being rotatable about an arm axis parallel to the boom axis with respect to the boom, and a bucket being rotatable about a bucket axis parallel to the arm axis and a tilting axis orthogonal to the bucket axis with respect to the arm, comprising:
   outputting an instruction for driving the working device in a working device operation plane orthogonal to at least one of the boom axis, the arm axis, and the bucket axis based on an operation state of at least one of the arm and the bucket and a distance between the bucket and a target construction ground shape indicating a target shape of an excavation target; and
   outputting an instruction for performing a tilting control of the bucket about the tilting axis based on a tilting state of the bucket and the distance between the bucket and the target construction ground shape.

* * * * *